(12) United States Patent
Irikura et al.

(10) Patent No.: US 6,447,419 B1
(45) Date of Patent: Sep. 10, 2002

(54) AXLE DRIVING APPARATUS

(75) Inventors: Koji Irikura; Hiroaki Shimizu, both of Hyogo-ken (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 0 days.

(21) Appl. No.: 09/642,147

(22) Filed: Aug. 21, 2000

Related U.S. Application Data

(62) Division of application No. 09/349,903, filed on Jul. 8, 1999, now Pat. No. 6,126,564.

(30) Foreign Application Priority Data

Jul. 8, 1998 (JP) .......................................... 10-193255
Jul. 8, 1998 (JP) .......................................... 10-193256

(51) Int. Cl.$^7$ .............................................. B62D 11/06
(52) U.S. Cl. ..................................................... 475/24
(58) Field of Search ........................... 475/24, 27, 221, 475/23, 18

(56) References Cited

U.S. PATENT DOCUMENTS

| | | |
|---|---|---|
| 2,255,348 A | 9/1941 | Brown |
| 2,311,922 A | 2/1943 | Allin |
| 2,332,838 A | 10/1943 | Borgward |
| 2,336,911 A | 12/1943 | Zimmermann |
| 2,336,912 A | 12/1943 | Zimmerman |
| 2,391,735 A | 12/1945 | Orshansky, Jr. |
| 2,530,720 A | 11/1950 | Paulson |
| 2,745,506 A | 5/1956 | McCallum |
| 2,763,164 A | 9/1956 | Neklutin |
| 2,936,033 A | 5/1960 | Gates |
| 3,059,416 A | 10/1962 | Campbell |
| 3,371,734 A | 3/1968 | Zaunberger et al. |
| 3,376,760 A | 4/1968 | Gordanier |

(List continued on next page.)

FOREIGN PATENT DOCUMENTS

| | | |
|---|---|---|
| CH | 249274 | 6/1947 |
| DE | 4224887 | 9/1993 |
| EP | 0 806 337 A1 | 12/1997 |

(List continued on next page.)

OTHER PUBLICATIONS

Brochure regarding differential steering pp. 4–15.
Article regarding differential steering Jul. 1985 p. 61.
Popular Science, Tanks and dozers turn on a dime with new all gear steering, pp. 60–62, Jul. 1985.

(List continued on next page.)

Primary Examiner—Charles A Marmor
Assistant Examiner—Roger Pang
(74) Attorney, Agent, or Firm—Sterne, Kessler, Goldstein & Fox P.L.L.C.

(57) ABSTRACT

An axle driving apparatus comprising a combination of a speed-change HST for coupling a variable-capacity pump and a motor with a fluid on the one hand and a steering HST for coupling a variable-capacity pump and a motor with a fluid on the other hand, configured in such a manner that the two HSTs are accommodated in a common housing. The motor output of the speed-change HST is transmitted to a differential arrangement for differentially coupling a pair of axles, and the motor output of the steering HST is transmitted to a differential arrangement for differentially coupling a pair of steering output shafts. One of the steering output shafts and one of the axles are power-coupled to one transmission train, while the other steering output shaft and the other axle are power-coupled to the other transmission train which applies a turning effort to the other axle in the direction opposite to the turning effort applied to the first axle by the first transmission train. The capacity adjusting means of the pump of the steering HST is operatively interlocked with a steering operation means such as a steering wheel, so that the capacity adjusting means is rotated in one direction in forward drive and in the other direction in rearward drive when the steering wheel is manipulated in a predetermined direction.

10 Claims, 13 Drawing Sheets

U.S. PATENT DOCUMENTS

| | | | | |
|---|---|---|---|---|
| 3,395,671 | A | 8/1968 | Zimmermann, Jr. | |
| 3,450,218 | A | 6/1969 | Looker | |
| 3,492,891 | A | 2/1970 | Livezey | |
| 3,530,741 | A | 9/1970 | Charest | |
| 3,590,658 | A * | 7/1971 | Tuck | 475/24 |
| 3,596,535 | A * | 8/1971 | Polak | 475/24 |
| 3,603,176 | A * | 9/1971 | Tipping | 475/23 |
| 3,612,199 | A | 10/1971 | Vissers | |
| 3,717,212 | A | 2/1973 | Potter | |
| 3,901,339 | A | 8/1975 | Williamson | |
| 3,903,977 | A | 9/1975 | Gillette et al. | |
| 3,907,051 | A | 9/1975 | Weant et al. | |
| 3,966,005 | A * | 6/1976 | Binger | 475/24 X |
| 3,978,937 | A | 9/1976 | Chichester et al. | |
| 4,133,404 | A | 1/1979 | Griffin | |
| 4,174,762 | A | 11/1979 | Hopkins et al. | |
| 4,245,524 | A | 1/1981 | Dammon | |
| 4,281,737 | A | 8/1981 | Molzahn | |
| 4,320,810 | A | 3/1982 | Hillmann | |
| 4,399,882 | A | 8/1983 | O'Neill et al. | |
| 4,471,669 | A | 9/1984 | Seaberg | |
| 4,577,711 | A | 3/1986 | Butler | |
| 4,718,508 | A | 1/1988 | Tervola | |
| 4,729,257 | A | 3/1988 | Nelson | |
| 4,732,053 | A | 3/1988 | Gleasman et al. | |
| 4,738,328 | A | 4/1988 | Hayden | |
| 4,776,235 | A | 10/1988 | Gleasman et al. | |
| 4,776,236 | A | 10/1988 | Gleasman et al. | |
| 4,782,650 | A | 11/1988 | Walker | |
| 4,790,399 | A | 12/1988 | Middlesworth | |
| 4,809,796 | A | 3/1989 | Yamaoka et al. | |
| 4,813,506 | A | 3/1989 | Smith | |
| 4,875,536 | A | 10/1989 | Saur et al. | |
| 4,882,947 | A | 11/1989 | Barnard | |
| 4,895,052 | A | 1/1990 | Gleasman et al. | |
| 4,917,200 | A | 4/1990 | Lucius | |
| 4,949,823 | A | 8/1990 | Coutant et al. | |
| 5,004,060 | A | 4/1991 | Barbagli et al. | |
| 5,015,221 | A | 5/1991 | Smith | |
| 5,052,511 | A | 10/1991 | Hunt | |
| 5,094,326 | A | 3/1992 | Schemelin et al. | |
| 5,131,483 | A | 7/1992 | Parkes | |
| RE34,057 | E | 9/1992 | Middlesworth | |
| 5,195,600 | A * | 3/1993 | Dorgan | 475/27 X |
| 5,279,376 | A | 1/1994 | Yang et al. | |
| 5,285,866 | A | 2/1994 | Ackroyd | |
| 5,307,612 | A | 5/1994 | Tomiyama et al. | |
| 5,335,739 | A | 8/1994 | Pieterse et al. | |
| 5,339,631 | A | 8/1994 | Ohashi | |
| 5,383,528 | A | 1/1995 | Nicol | |
| 5,387,161 | A * | 2/1995 | Shibahata | 475/5 |
| 5,505,279 | A | 4/1996 | Louis et al. | |
| 5,507,138 | A | 4/1996 | Wright et al. | |
| 5,517,809 | A | 5/1996 | Rich | |
| 5,535,840 | A | 7/1996 | Ishino et al. | |
| 5,553,453 | A | 9/1996 | Coutant et al. | |
| 5,560,447 | A | 10/1996 | Ishii et al. | |
| 5,564,518 | A | 10/1996 | Ishii et al. | |
| 5,644,903 | A | 7/1997 | Davis, Jr. | |
| 5,649,606 | A | 7/1997 | Bebernes et al. | |
| 5,667,032 | A | 9/1997 | Kamlukin | |
| 5,706,907 | A | 1/1998 | Unruh | |
| 5,722,501 | A | 3/1998 | Finch et al. | |
| 5,775,437 | A * | 7/1998 | Ichikawa et al. | 172/74 |
| 5,842,378 | A | 12/1998 | Zellmer | |
| 5,850,886 | A | 12/1998 | Kouno et al. | |
| 5,894,907 | A | 4/1999 | Peter | |
| 5,910,060 | A * | 6/1999 | Blume | 475/28 |
| 5,913,802 | A | 6/1999 | Mullet et al. | |
| 5,946,894 | A | 9/1999 | Eavenson et al. | |
| 5,947,219 | A | 9/1999 | Peter et al. | |
| 5,975,224 | A | 11/1999 | Satzler | |
| 5,997,425 | A * | 12/1999 | Coutant et al. | 475/23 X |
| 6,026,634 | A | 2/2000 | Peter et al. | |
| 6,035,959 | A | 3/2000 | Schaeder | |
| 6,038,840 | A | 3/2000 | Ishimori et al. | |
| 6,098,737 | A * | 8/2000 | Aoki | 475/28 X |
| 6,126,564 | A | 10/2000 | Irikura et al. | |
| 6,129,164 | A * | 10/2000 | Teal et al. | 475/23 X |
| 6,141,947 | A | 11/2000 | Borling | |
| 6,196,348 | B1 * | 3/2001 | Yano et al. | 180/242 |
| 6,260,641 | B1 * | 7/2001 | Hidaka | 190/6.44 |

FOREIGN PATENT DOCUMENTS

| | | |
|---|---|---|
| FR | 1147142 | 10/1960 |
| GB | 2 303 829 A | 3/1997 |
| JP | 57-140277 | 8/1982 |
| JP | 63-227476 | 9/1988 |
| JP | 2-261952 | 10/1990 |
| JP | 6-264976 | 9/1994 |
| JP | 8-142906 | 6/1996 |
| JP | 9-202255 | 8/1997 |
| JP | 9-202258 | 8/1997 |
| JP | 9-202259 | 8/1997 |
| JP | 9-216522 | 8/1997 |
| WO | 92/12889 | 8/1992 |
| WO | WO 98/32645 | 7/1998 |
| WO | 99/40499 | 8/1999 |
| WO | WO 00/01569 | 1/2000 |

OTHER PUBLICATIONS

The Engineer, Tank Steering Mechanisms, pp. 337–340, Mar. 3, 1967.

Excel Industries Inc., U–T–R The Ultimate Turning Radius, pp. 1–6, 1992.

Electric Tractor Corporation, An Idea Whose Time Has Come, 5 pages, date of publication unknown, published in Ontario, Canada.

Electric Tractor Corporation, Model #9620, The Ultimate Lawn and Garden Tractor, 6 pages, date of publication, Jul. 27, 1998.

Farm Show Magazine, Battery Powered Riding Mower, 1 page, date of publication, Mar.–Apr. 1996.

Deere & Company, 240, 245, 260, 265, 285 and 320 Lawn and Garden Tractors Technical Manual, front cover ang p. 10–2 to 10–4 and 10–6, date of publication, 1996.

Excel Industries, Inc., Hustler 4000 Series, 1995, pp. 1–8.

Woods Equipment Company, Woods Mow'n Machine, 1997, pp. 1–12.

Ex–Mark, ExMark Nobody Does It Better Professional Turf Care Equipment, 1997, pp. 1–20.

Dixon Industries, Inc. Dixon ZTR Riding Mowers, 1997, pp. 1–4.

Shivers Mfg., Zero Turn Radius Mower The Commercial Clipper, 1997, pp. 1–4.

Ferris Industries, Inc., The ProCut Z Zero–Turn Rider, 1997, pp. 1–2.

Zipper–TS Mower, The Zipper–TS Mowers, 1997, pp. 1–2.

Westwood, The Westwood Clipper Owner's Instruction Manual, date of publication unknown, pp. 1–19.

U.S. patent application Ser. No. 09/372,747, filed Aug. 11, 1999.

U.S. patent application Ser. No. 09/489,678, filed Jan. 24, 2000.

U.S. patent application Ser. No. 09/489,680, filed Jan. 24, 2000.

U.S. patent application Ser. No. 09/622,414, filed Aug. 16, 2000.

U.S. patent application Ser. No. 09/700,147, filed Nov. 13, 2000.

U.S. patent application Ser. No. 09/700,923, filed Nov. 21, 2000.

* cited by examiner

AXLE DRIVING APPARATUS

CROSS-REFERENCE TO RELATED APPLICATION

This application is a division of U.S. application Ser. No. 09/349,903, filed Jul. 8, 1999 now U.S. Pat. No. 6,126,564 (allowed).

BACKGROUND OF THE INVENTION

1. Field of the Invention

The present invention relates to a novel and inventive axle driving apparatus for running vehicles, comprising a combination of two hydraulic transmissions (hereinafter referred to as HST), one for forward-rearward drive switching and changing speed, and the other for steering, wherein a steering device such as a steering wheel is manipulated in the same direction to turn the vehicle in the right or left direction regardless of whether the vehicle is running forward or rearward.

2. Related Art

A running vehicle having a configuration in which a pair of right and left driving axles are driven separately by a pair of HSTs is well known. One example thereof is disclosed in U.S. Pat. No. 4,782,650. In such a vehicle, the output rotational speeds of the two HSTs are rendered to coincide with each other when the vehicle is running straight, and are differentiated when the vehicle turns right or left.

In the conventional vehicle having two HSTs as described above, the HSTs, together with the link mechanism and the axles associated with the HSTs, require high precision in fabrication and assembly to accomplish an exact coincidence of the output rotational speed of the HSTs when the vehicle is driving straight. Also, considerable time is required for output adjustment of the left and right driving axles before shipment. Assuming that the pump or motor capacity is different between the two HSTs due to a fabrication error or the like, it is possible to make adjustments to assure the same rotational speed of the right and left axles when the vehicle is running straight. When the vehicle turns right or left, however, the steering feel is different between right and left turns, thereby making the vehicle difficult to maneuver.

With such a vehicle, a pair of HSTs are normally juxtaposed on right and left sides, which in turn increases the vehicle width, resulting in difficulty for the vehicle to make a small turn. Also, in the case of a specialty vehicle, the job efficiency is adversely affected.

One solution to the problem of an axle driving apparatus having two combined HSTs is a configuration in which one HST is used for speed change with a pair of axles powercoupled to a normal differential arrangement for differential coupling and the other HST is used for steering with an output rotation thereof applied through another steering differential arrangement to the two axles for rotation in opposite directions, so that at the time of steering, one axle is increased in speed by the output from the steering differential arrangement, and the other axle is decreased in speed. This turns the vehicle toward the side of the decelerating axle.

In this configuration, the rotational direction of the steering HST is switched according to the direction in which the steering wheel or other steering means is manipulated. Even when the steering wheel is manipulated in the same direction, the axle operatively coupled to the speed-change HST is rotated in the opposite direction depending on whether the vehicle is running forward or rearward. Thus, the axle increased in speed when the vehicle is running forward is decreased in speed when the vehicle is running rearward, and vice versa. In a configuration in which the steering means is a steering wheel, counterclockwise rotation of the steering wheel in the forward drive mode decelerates the left axle and accelerates the right axle to turn the vehicle to the left. If, however, the steering wheel is rotated counterclockwise when the vehicle is running in reverse, the left axle is accelerated while the right axle is decelerated, thereby causing the vehicle to turn to the right. In other words, for the vehicle to turn left while running in reverse, the steering wheel is required to be rotated clockwise. This gives the driver a driving feel that is considerably different from one normally experienced in passenger cars. This may lead to an increase in traffic accidents due to a driving error.

SUMMARY OF THE INVENTION

According to the present invention, there is provided an axle driving apparatus comprising a pair of axles, a speed-change HST including a fluid pressure pump of variable capacity type and a motor of fluid pressure type coupled to each other through a fluid, a first differential arrangement powercoupled to the output means of the motor of the speed-change HST for differentially coupling the axle pair to each other, a steering HST including a fluid pressure pump of variable capacity type and a motor of fluid pressure type coupled to each other through a fluid, a second differential arrangement powercoupled to the output means of the motor of the steering HST, a pair of steering output shafts differentially coupled to each other through the second differential arrangement, a first transmission train interposed between one of the steering output shafts and one of the axles, and a second transmission train interposed between the other steering output shaft and the other axle for transmitting the turning effort to the other axle in the direction opposite to that of the first transmission train, by which the steering operation means is operated in the same direction to turn the vehicle in the same direction regardless of whether the vehicle is running forward or rearward.

In a first configuration to achieve this object, a vehicle comprises a forward/rearward setting operation means, speed-change operation means and steering operation means. In the axle driving apparatus, on the other hand, first adjusting means is provided which, by changing the position thereof, can change the capacity and the rotational direction of the pump of the speed-change HST. Also, a first rotary member is rotated with a first rotary shaft for changing the position of the first adjusting means. A first link mechanism is interposed between the speed-change operation means and the first rotary member. The first link mechanism includes a first link connected to the first rotary member at a changeable position while at the same time being coupled to a forward/rearward drive setting operation means. A second adjusting means is provided also which, by changing the position thereof, is capable of changing the capacity and the rotational direction of the pump of the steering HST. A second rotary member is rotated with a second rotary shaft for changing the position of the second adjusting means. A second link mechanism is interposed between the second rotary member and the steering operation means. The second link mechanism includes a second link connected to the second rotary member at a changeable position while at the same time being coupled to the forward/rearward drive setting operation means. In accordance with the switching of the forward/rearward drive setting by the forward/rearward drive setting operation means, the position of the first link connecting the first rotary member and the position of the second link connecting the second rotary member are changed.

In this first configuration, when the forward/rearward drive setting is switched by the forward/rearward drive setting operation means, the position of the first link connecting the first rotary member is changed, so that the output rotation of the speed-change HST is reversed and the axle rotates in the opposite direction. At the same time, however, the position of the second link connecting the second rotary member is also changed.

When the steering operation means is operated in the same direction, the output rotation of the steering HST is reversed between when the vehicle is running forward and when it is running rearward. Thus the axle acceleration and deceleration remain unchanged regardless of whether the vehicle is running forward or rearward. For this reason, the vehicle body can be turned in the same direction by operating the steering operation means in the same direction whether the vehicle is running forward or rearward.

In this configuration, the first rotary member may include a first guide means so that the first link is connected to the first rotary member through the first guide means at a changeable position, and the second rotary member may include a second guide means so that the second link is connected to the second rotary member through the second guide means at a changeable position. This makes it possible to change the connecting position of the first and second links smoothly with respect to the first and second rotary members, respectively.

Further, at least one of the first guide means and the second guide means may be a hole slidably fitted in a part of the first link or the second link, as the case may be. The machining cost can thus be saved with a simple configuration.

Next, in a second configuration to achieve this object, a forward rotation/reverse rotation switching transmission mechanism is interposed between the output means of the motor of the steering HST and the input means of the second differential arrangement. When the steering operation means is operated in the same direction, the motor of the steering HST is rotated in the same direction whether the vehicle is running forward or rearward. The direction of rotation of the steering output shaft is reversed, however, by switching the forward rotation transmission and the reverse rotation transmission by the forward rotation/reverse rotation switching transmission mechanism so that the motor output is transmitted to the second differential arrangement.

In one configuration of the forward rotation/reverse rotation switching transmission mechanism, a selective coupling means is provided by which the forward rotation transmission train is coupled to the input means of the second differential arrangement, the reverse rotation transmission train is coupled to the input means of the second differential arrangement or one of the forward rotation transmission trains and the reverse rotation transmission train is selectively coupled to the output means of the motor of the steering HST.

In this configuration, the forward/rearward drive setting switching means is provided outside of the housing, and the selective coupling means selects the forward rotation transmission train or the reverse rotation transmission train in accordance with the switching of the forward/rearward drive setting by the forward/rearward drive setting operation means, thereby coupling the selected train to the output means of the motor of the steering HST.

In this regard, the output means of the motor of the steering HST may be an output shaft, and the selective coupling means may be a sliding gear arranged slidably on the output shaft and not relatively rotatably. Further, assuming that the forward rotation transmission train and the reverse rotation transmission train may both include a gear adapted to engage the sliding gear, the sliding gear may selectively engage one of the forward rotation transmission input gear and the reverse rotation transmission input gear.

As an alternative, the selective coupling means may include a sliding gear arranged slidably on the output shaft of the HST motor for steering and not relatively rotatably and a clutch attached to the sliding gear. A gear adapted to engage the sliding gear may be arranged on one of the forward rotation transmission train or the reverse rotation transmission train. A clutch adapted to engage the first clutch described above may be included in the forward rotation transmission train or the reverse rotation transmission train. The engagement of the sliding gear or the engagement of the first clutch can be selected.

In another configuration of the forward rotation/reverse rotation switching transmission mechanism, the forward rotation/reverse rotation switching transmission mechanism includes a forward rotation transmission train coupled to the input means of the second differential arrangement, a first electromagnetic clutch for permitting the forward rotation transmission train to engage or disengage from the output means of the motor of the steering HST, a reverse rotation transmission train coupled to the input means of the second differential arrangement and a second electromagnetic clutch for permitting the reverse rotation transmission train to engage or disengage from the output means of the motor of the steering HST. The forward/rearward drive setting operation means is arranged outside of the housing, so that the first electromagnetic clutch or the second electromagnetic clutch is selectively engaged by the forward/rearward setting operation means switching the forward/rearward drive setting.

The other object, features and advantages of the present invention are more fully understood from the following description.

DETAILED DESCRIPTION OF THE PREFERRED EMBODIMENTS

Figure 1:
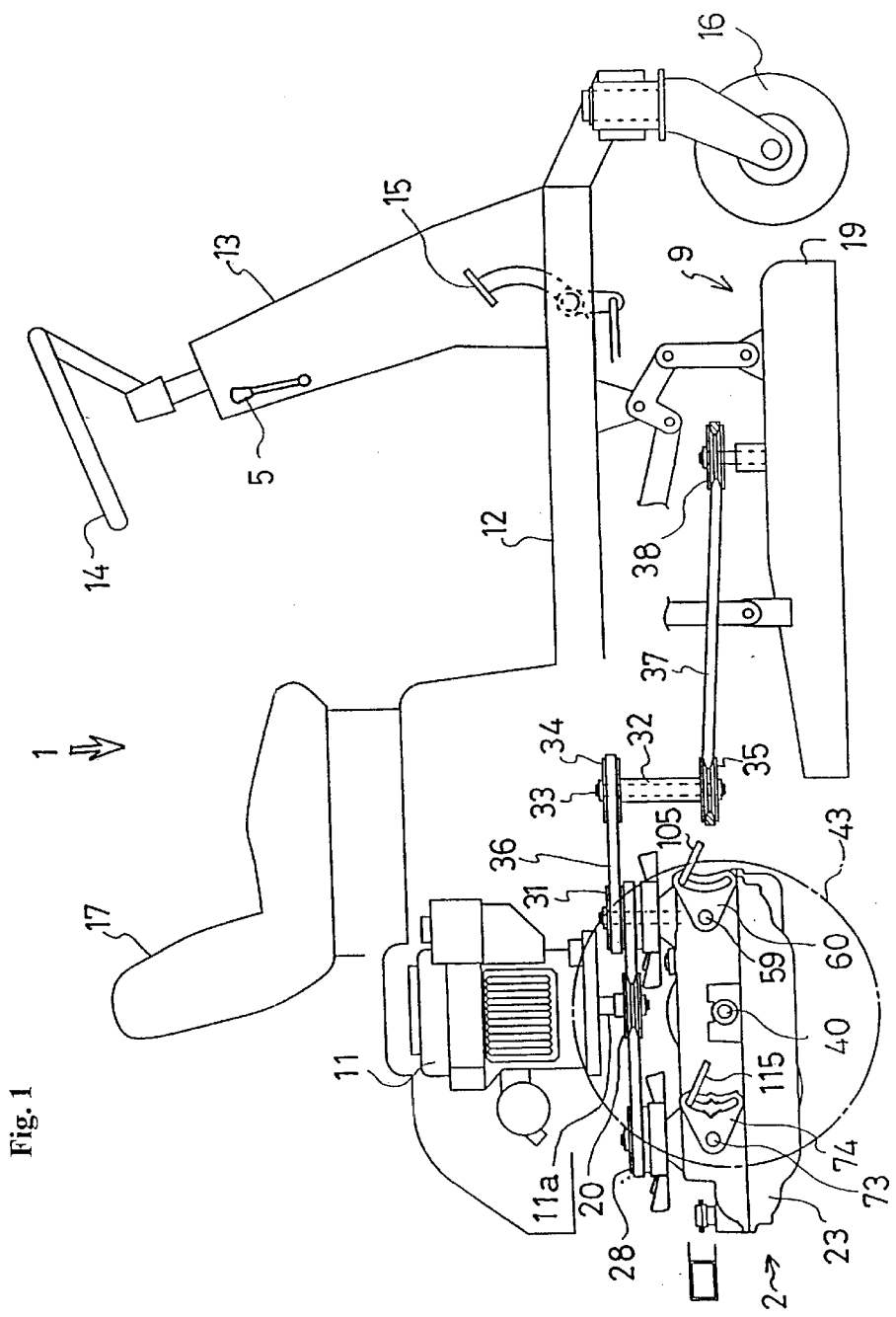
FIG. 1 is a side view of a mower vehicle employing an axle driving apparatus according to this invention.

A general configuration of a riding lawn mower equipped with an axle driving apparatus including a pair of HSTs according to this invention will be explained with reference to FIG. 1.

A front column 13 is erected on the upper front portion of a chassis 12, and a steering wheel 14 as steering operation means is protruded above the front column 13. A speed-change pedal 15 constituting speed-change operation means, a reverser lever 5 constituting a forward/rearward drive switching operation means and a brake pedal not shown are arranged on the side of the front column 13. Front wheels 16, 16 comprising castor wheels are arranged on both sides of the front lower portion of the chassis 12. In this embodiment, two front wheels 16 are arranged on the right and left sides of chassis 12. Alternatively, one front wheel or three or more front wheels may be provided. In the case where the front wheels 16 are castor wheels as in FIG. 1, when the vehicle turns about the rear wheels 43 as described later, the front wheels 16 can turn in an intended direction with greater ease and rapidity than when operatively interlocked with the steering wheel, for an improved maneuverability.

A seat 17 is placed at a position above the center of the chassis 12, and a mower 9 is arranged at the lower part. The mower 9 includes a rotary blade in a case 19 and is driven by an engine 11 (described later) through a pulley and a belt. Also, a lifting link mechanism is coupled to the upper front portion and the upper rear portion of the case 19 to permit vertical motion of the mower 9.

The engine 11 is mounted on the upper rear portion of the chassis 12 and covered with a bonnet. The engine 11 is of the vertical type, i.e. has an output shaft 11a protruding vertically downward and an output pulley 20 fixedly arranged at the lower end of the output shaft 11a.

Figure 2:
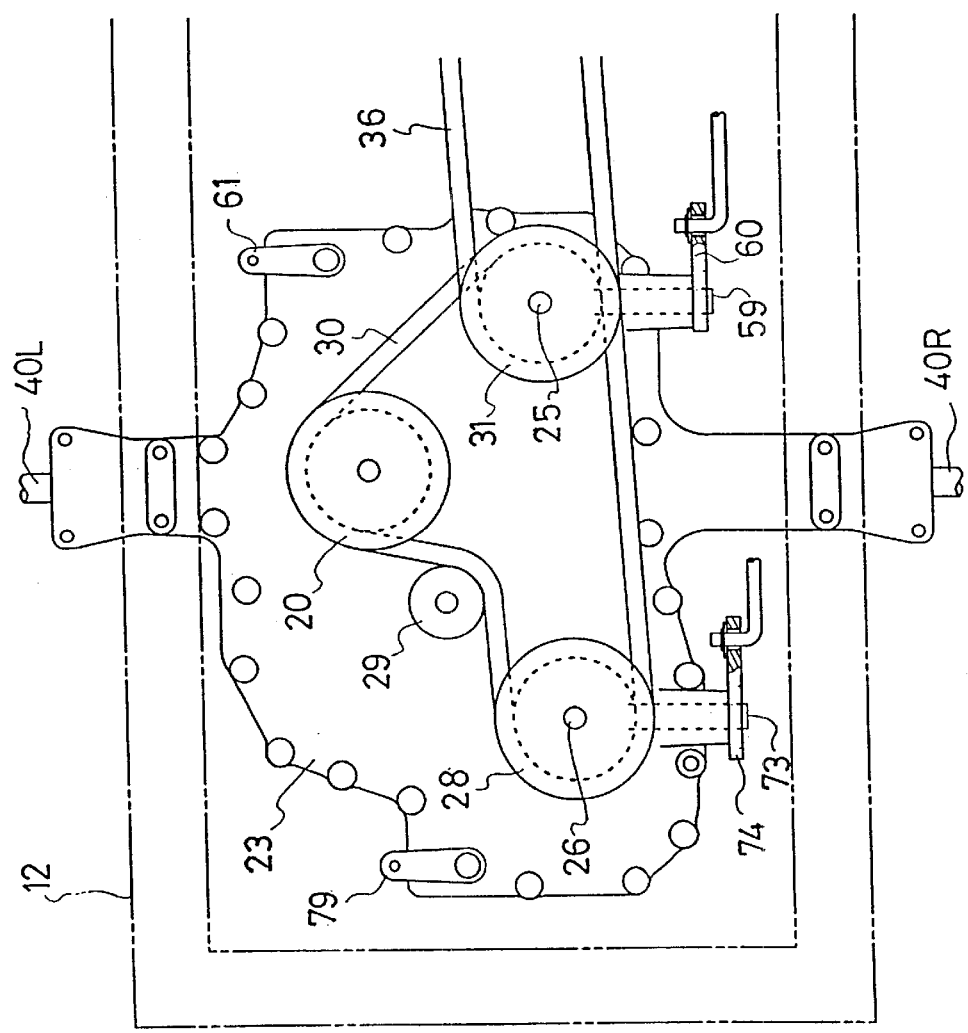
FIG. 2 is a plan view of an axle driving apparatus according to this invention.
Figure 3:
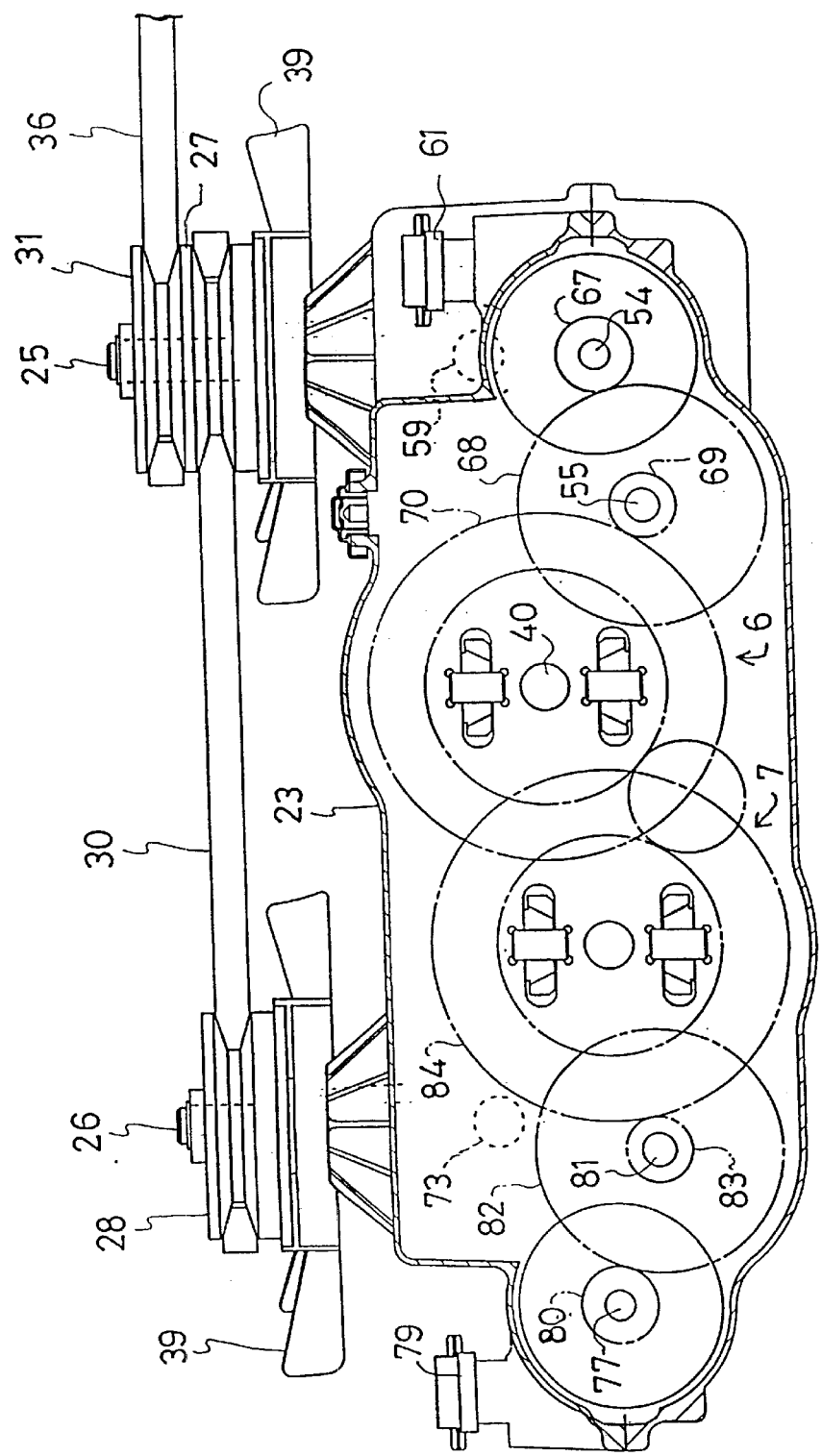
FIG. 3 is a side cross-sectional view of the apparatus of FIG. 2.
Figure 4:
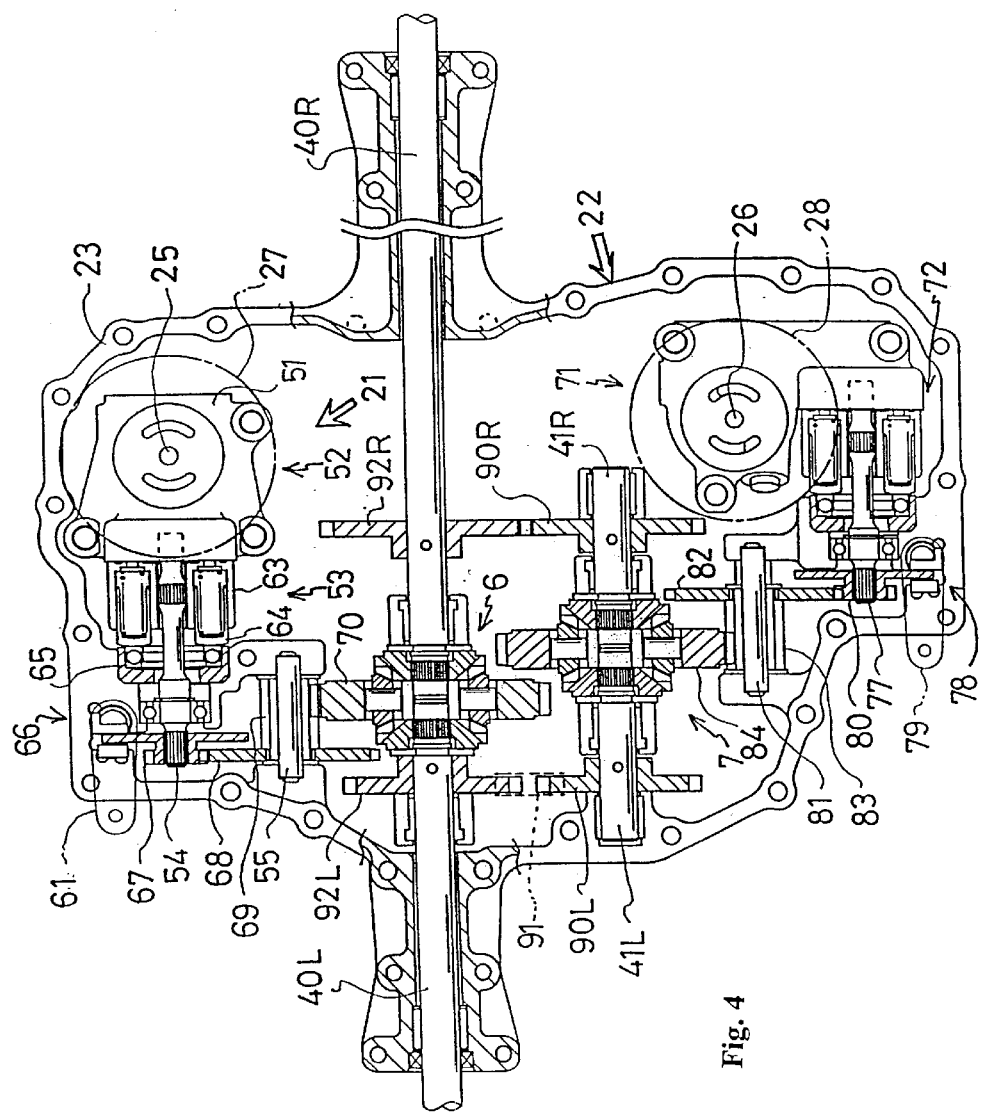
FIG. 4 is a top cross-sectional view of the apparatus of FIG. 2.

An axle driving apparatus 2 according to this invention is arranged on the lower rear portion of the chassis 12. The axle driving apparatus 2, as shown in FIGS. 2, 3 and 4, comprises a speed-change HST 21 and a steering HST 22, each having a hydraulic pump and a hydraulic motor, a differential arrangement, and a pair of right and left axles 40L, 40R, accommodated in a single housing 23. The two HSTs 21, 22 are arranged longitudinally in the housing 23, and therefore the axle driving apparatus 2 has a laterally compact configuration. The reduced vehicle width allows the vehicle to make smaller turns. Either of the HSTs 21 and 22 may be in front of the other.

A first input shaft 25 and a second input shaft 26 constituting pump shafts of the speed-change HST 21 and the steering HST 22, respectively, protrude upwardly from the housing 23. A first input pulley 27, a second input pulley 28 and fans 39, 39 are fixedly arranged on the first input shaft 25 and the second input shaft 26, respectively. The output pulley 20 and a tension pulley 29 are arranged between the first input pulley 27 and the second input pulley 28. The first input pulley 27, the second input pulley 28 and the output pulley 20 are coupled to each other by a belt 30, which is pressed by a tension pulley 29. In this way, power is transmitted from the engine 11 to the first input pulley 27 and the second input pulley 28 at the same time.

Further, a PTO pulley 31 is arranged on the first input shaft 25. As shown in FIG. 1, on the other hand, a support pipe 32 is erected midway of the length of the chassis 12, and a counter shaft 33 is rotatably inserted in the support pipe 32. Pulleys 34, 35 are fixed on the upper and lower portions, respectively, of the counter shaft 33, and protrude from the upper and lower ends of the support pipe 32. A belt 36 is wound over the pulley 34 and the PTO pulley 31, and a belt 37 is wound between a pulley 35 and the pulley 38 fixed on the input shaft of the mower 9, thereby constituting a driving mechanism of the mower 9. As an alternative, a tension pulley may be arranged between the pulley 35 and the pulley 38 so that the belt 37 can be pressed, and a belt tension clutch may be added so that the driving force of the mower 9 can be turned on and off.

Now, an internal configuration of the housing 23 of the axle driving apparatus 2 will be explained with reference to FIGS. 3, 4 and 5.

The speed-change HST 21, the steering HST 22, the normal differential arrangement 6, the steering differential arrangement 7, the axles 40L, 40R and the power transmission gear mechanism are accommodated in the housing 23, which is divisible into upper and lower portions.

The hydraulic pump 52 is mounted on the horizontal portion of a generally L-shaped center section 51 having a horizontal extension (horizontal portion) and a vertical extension (vertical portion), and a hydraulic motor 53 is mounted on the vertical portion. The hydraulic pump 52 and the hydraulic motor 53 are coupled to each other through a fluid by a closed circuit configured in the center section 51. The HST 21 according to this embodiment has the hydraulic motor 53 arranged on one side of the hydraulic pump 52 to assure a longitudinally compact form.

The housing 23 is configured by coupling horizontally flat peripheral coupling surfaces to each other. The bearings of a motor shaft 54 and a counter shaft 55 are arranged on a coupling surface of the housing 23. The bearings of the axles 40L, 40R are rotatably supported by being deviated upward of the coupling surface. The axles 40L, 40R are differentially coupled to each other by the differential arrangement 6 in the housing 23, and have each external end thereof protruding laterally outwardly of the housing 23.

A pump mounting surface for the hydraulic pump 52 is formed on the horizontal surface of the center section 51. An input shaft 25 constituting the pump shaft is vertically supported at the center of the pump mounting surface. A cylinder block (not shown) is fitted in the input shaft 25 and rotatably and slidably arranged on the pump mounting surface. A plurality of pistons adapted for reciprocal motion are fitted in the cylinder block through an energization spring. The head of each piston is brought into contact with a movable swash plate 57 (shown in FIG. 5, e.g.) above the cylinder block. The movable swash plate 57 is tilted as a speed adjusting member, so that the amount and direction of the oil discharged from the hydraulic pump 52 can be changed.

In order to tilt the movable swash plate 57, a control shaft 59 is supported on a bearing in parallel to the axle 40 on the side wall of the housing 23 (FIG. 2). A neutral return spring is fitted over a control shaft 59 in the housing, so that the movable swash plate 57 is urged to the neutral position which can be adjusted. A control arm 60 is fixed on the control shaft 59 outside of the housing 23 and coupled to the speed-change operation means such as a lever or a pedal, or the speed-change pedal 15 in this embodiment, through a link mechanism described later. The speed-change pedal 15 can increase the speed of the vehicle in accordance with the depression angle thereof.

In this configuration, by rotating speed-change pedal 15, a control arm 60 is rotated longitudinally of the apparatus body, and the rotation of the control shaft 59 tilts the movable swash plate 57, thus changing the direction and amount in which the working oil is discharged from the hydraulic pump 52. The pressured oil from the hydraulic pump 52 is supplied to the hydraulic motor 53 through an oil passage in the center section 51. A motor mounting surface for the hydraulic motor 53 is formed on the vertical surface of the center section 51. A cylinder block 63 is rotatably supported on the motor mounting surface. A plurality of pistons 64 are reciprocally fitted in a plurality of cylinder holes of the cylinder block 63 through energization springs. The head of each piston 64 is in contact with a fixed swash plate 65. The motor shaft 54 is arranged in horizontal position and engaged integrally with the rotational axis of the cylinder block 63 in a manner incapable of relative rotation, thereby constituting the hydraulic motor 53.

A brake unit 66 is arranged on the motor shaft 54. A gear 67 is fixed at an end of the motor shaft 54 and in mesh with a large gear 68 fixed on the counter shaft 55. A small gear 69 fixed on the counter shaft 55 is in mesh with a ring gear 70 constituting input means of the differential arrangement 6.

The steering HST 22 has substantially the same configuration as, and is arranged substantially longitudinally symmetrically with respect to, the speed-change HST 21. Specifically, a hydraulic pump 71 and a hydraulic motor 72 having substantially the same configuration as the hydraulic pump 52 and the hydraulic motor 53, respectively, are connected through a fluid in the same manner in a similar center section. The hydraulic motor 72 is also arranged on one lateral side of the hydraulic pump 71 (the side opposite to the position at which the hydraulic motor 53 is arranged with respect to the hydraulic pump 52) thereby producing a vertically compact configuration. Thus, the speed-change HST 21 and the steering HST 22 are compatible with each other, so that either HST can be used for either function. This part sharing reduces the manufacturing cost.

The shape of the center section and relative positions of the hydraulic pump and the hydraulic motor are not limited to those disclosed in FIG. 4. Preferably, the two HSTs are longitudinally arranged to assure a short vehicle width and have a longitudinally short configuration.

The control shaft 73 for rotating the movable swash plate 76 of the hydraulic pump 71 protrudes outwardly toward the right axle 40R as shown in FIG. 2 of the housing 23. The control arm 74 fixed on the control shaft 73 outside of the housing 23 is operatively interlocked with the steering wheel 14 through a link mechanism described later, and is configured to rotate the movable swash plate 76 by the rotation of the steering wheel 14.

The brake unit 78 is arranged at the forward end of the motor shaft 77 of the hydraulic motor 72. Thus, the brake unit 78 brakes the motor shaft 77 by the rotation of the brake arm 79. Also, a gear 80 is fixed on the motor shaft 77 and is in mesh with a gear 82 on the deceleration shaft 81. A gear 83 fixed on the deceleration shaft 81 is in mesh with the ring gear 84 of the steering differential arrangement 7.

Output gears 90L, 90R are fixed at the outer ends of the steering output shafts 41L, 41R, respectively, of the steering differential arrangement 7. One of the output gears 90L, 90R (the left output gear 90L in this embodiment) engages a gear 92L fixed on the axle 40L through an idle gear 91, while the other output gear 90R is in mesh with the gear 92R fixed on the axle 40R.

In the axle driving apparatus 2 described above, the rotation of the hydraulic motor 53 of the speed-change HST 21 upon depression of the speed-change pedal 15 is reduced through the gears 67, 68, 69 and transmitted to the ring gear 70 of the normal differential arrangement 6, thereby driving the axles 40L, 40R. Also, when the steering wheel 14 is manipulated to turn the vehicle right or left, the hydraulic motor 72 of the steering HST 22 rotates, and this rotation is reduced in speed through the gears 80, 82, 83 and transmitted to the ring gear 84 of the steering differential arrangement 7, so that power is transmitted to the steering output shafts 41L, 41R. At the same time, one of the steering output shafts 41L, 41R transmits the turning effort in the accelerating direction of rotation, and causes the other steering output shaft 41L or 41R to transmit the turning effort in the accelerating direction of rotation, with respect to the corresponding rotating output gears 92L, 92R. One of the axles 40L, 40R is thus accelerated, while the other is decelerated, thereby giving rise to a rotational difference between the right and left driving wheels (rear wheels 43, 43). As a result, the vehicle body can be turned right or left.

Figure 5:
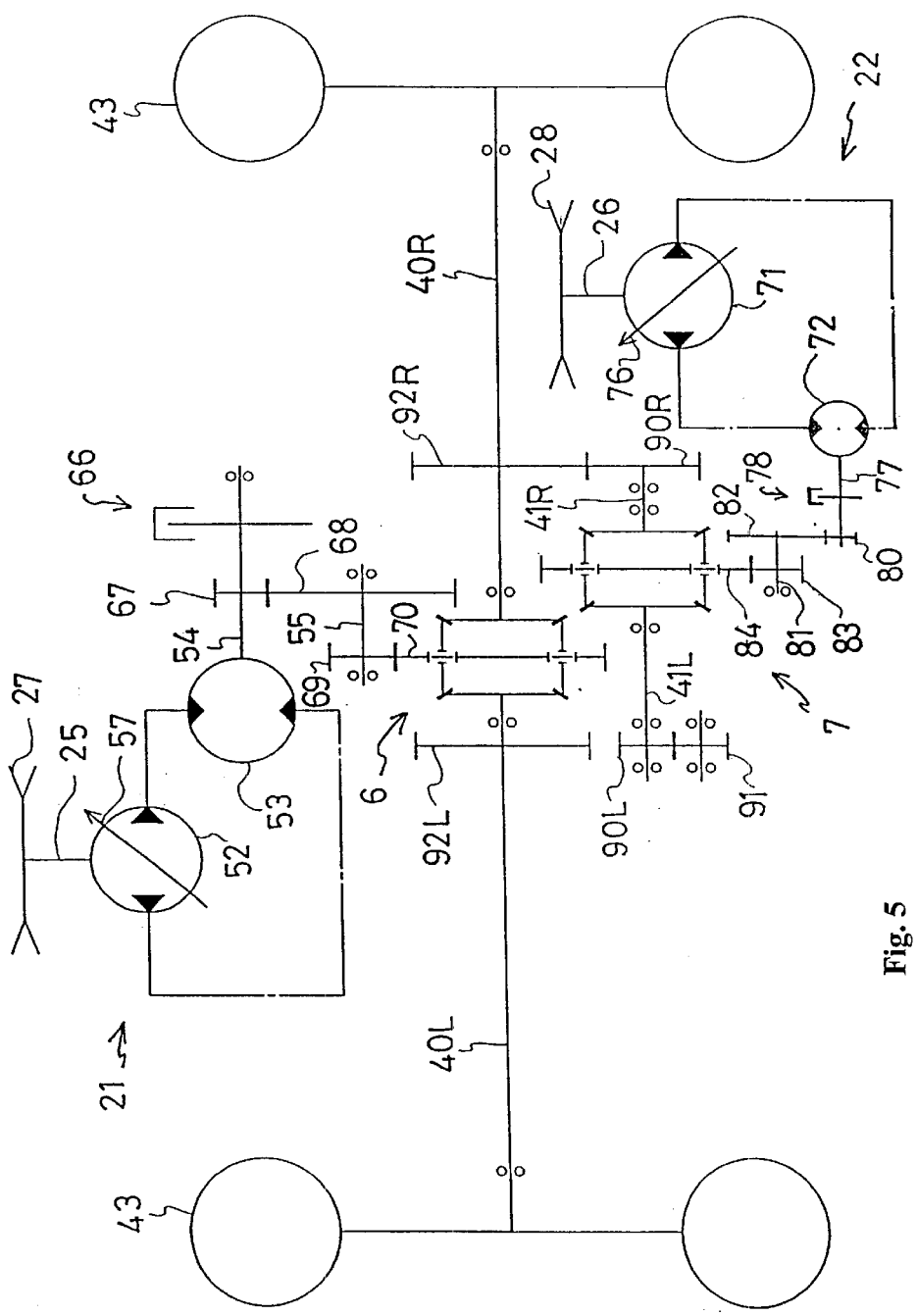
FIG. 5 is a schematic diagram showing a transmission mechanism in the housing of an axle driving apparatus according to this invention, in which a pair of differential arrangements are comprised of a pair of differential gear mechanisms.
Figure 6:
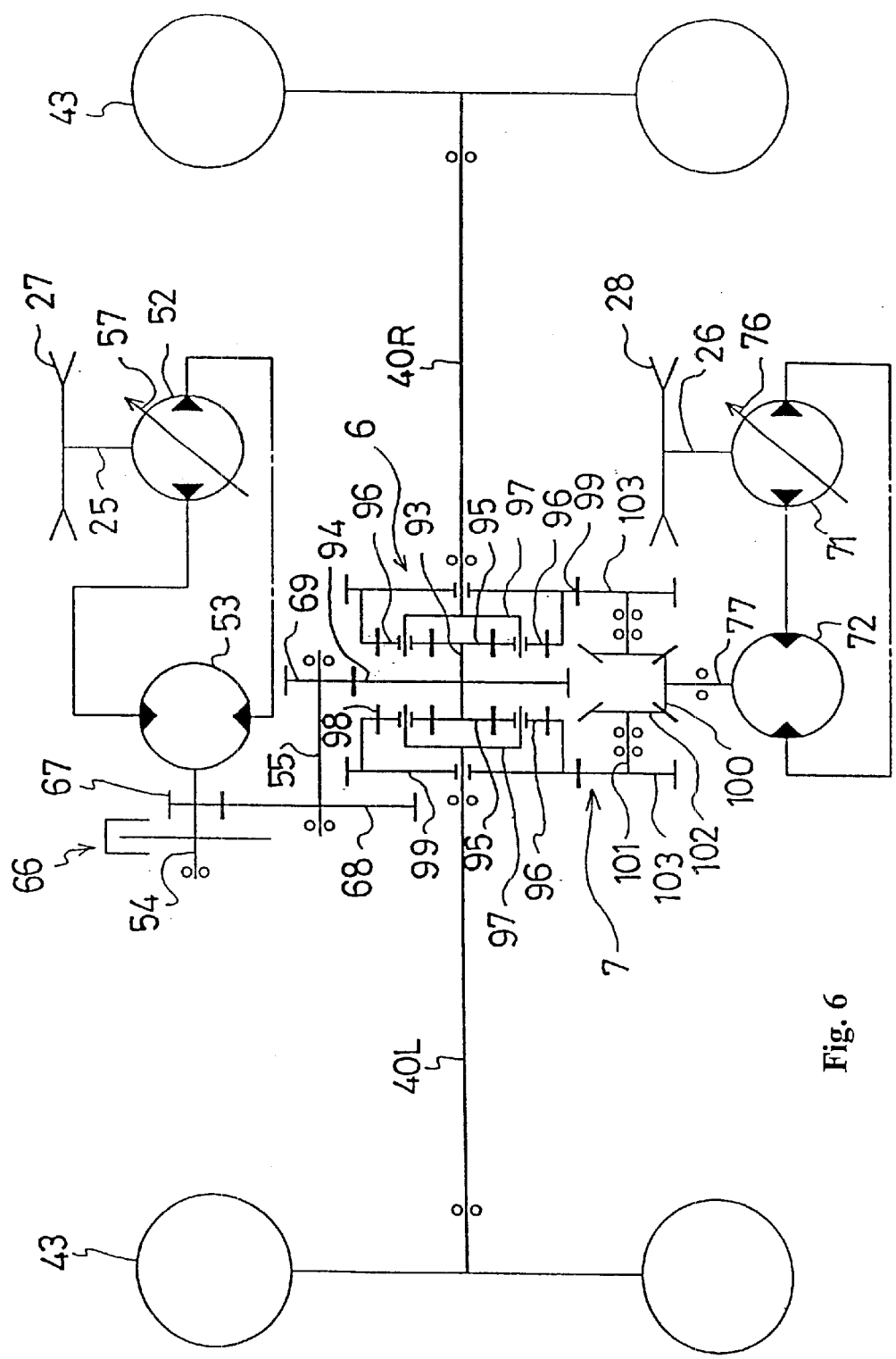
FIG. 6 is a schematic diagram showing another embodiment in which one of the pair of the differential arrangements for differentially coupling the axles is a planetary gear mechanism and the other differential arrangement for differentially coupling the steering output shafts is a bevel gear mechanism.

The axle driving apparatus 2 shown in FIGS. 3 to 5 uses two differential arrangements 6, 7 of differential gear type. As shown in FIG. 6, however, these gears may be replaced, with equal effect, by a combination of a planetary gear mechanism and a bevel gear mechanism, whereby the right and left axles can be differentiated for steering operation in a similar fashion. This embodiment will be explained below.

In the foregoing embodiment in which the output rotation of the hydraulic motor 53 is decelerated to transmit power, the small gear 69 is in mesh with a center gear 94 fixed on the center axis 93 arranged coaxially between the axles 40L, 40R. Sun gears 95, 95 are fixed at the ends of the center shaft 93. A plurality of planetary gears 96 are in mesh with the outer periphery of each sun gear 95. The planetary gears 96 in mesh with each sun gear 95 are supported on a carrier 97, which in turn is fixed on the inner end of the axles 40L, 40R.

An internal gear 98 is in mesh with the outside of each of the planetary gears 96 supported on the carrier 97. Each internal gear 98 is integrally formed with each outer gear 99 and loosely fitted on the axles 40L, 40R. This planetary gear mechanism constitutes a differential arrangement for differentially coupling the axles 40L, 40R.

As shown in FIG. 6, a bevel gear 100 is fixed on the motor shaft 77 of the hydraulic motor 72. Bevel gears 102,102 are arranged fixedly in opposed relation to each other at the inner end portions of a pair of support shafts 101, 101 and are in mesh with the bevel gear 100. A gear 103 is fixed at the outer end portion of each support shaft 101, and each gear 103 is in mesh with a corresponding outer gear 99. This bevel gear mechanism constitutes a steering differential arrangement having the support shafts 101, 101 as steering output shafts.

With this configuration, a pair of bevel gears 102, 102 driven by the output rotation of the hydraulic motor 72 are rotated in opposite directions. Therefore, the differential action of the planetary gear mechanism causes one of the axles 40L, 40R to increase in speed and the other axle to decrease in speed, thereby turning the vehicle body.

In the axle driving apparatus 2 shown in FIGS. 3 to 5 or the application thereof shown in FIG. 6, assume that the rotational direction of the hydraulic motor 72 or the steering differential arrangement 7 or the bevel gear mechanism shown in FIG. 6, is set in such a manner that the vehicle body turns right or left in accordance with the direction of rotation of the steering wheel 14 while the vehicle is running forward. One problem in this case is that if the steering wheel 14 is turned when the vehicle is running rearward, i.e. when the rotational direction of the hydraulic motor 53 is reversed, then the vehicle body turns in the direction opposite to the direction of rotation of the steering wheel 14. This is the opposite direction to an ordinary passenger car, and this makes it difficult for the driver to maneuver the steering wheel when the vehicle is running backward.

This phenomenon is caused by the fact that in the case where the vehicle body is turned in the same direction, the direction in which the steering output shafts 41L, 41R (support shafts 101, 101) rotate remains unchanged regardless of whether the vehicle is running forward or rearward. In view of the fact that the axles 40L, 40R are rotated in opposite directions according to whether the vehicle is running forward and rearward, the axle accelerated by the forward drive of the vehicle is decelerated by the rearward drive, and vice versa.

According to this invention, therefore, the axle driving apparatus 2 is improved in such a manner that in the case where the steering wheel 14 constituting the steering operation means is rotated in one direction, the vehicle body turns in the same direction that the steering wheel 14 is turned regardless of whether the vehicle is running forward or rearward. This can be accomplished by the arrangement in which the steering output shafts 41L, 41R (support shafts 101)are rotated in opposite directions when the vehicle body turns in the same direction regardless whether it is running forward and rearward. A probable solution is a method in which the discharge direction of the pump 71 in the steering HST 21 is switched in opposite ways between when the vehicle is running forward and when the vehicle is running rearward. Another solution is to transmit the turning effort of the motor shaft 73 in opposite directions to the power transmission system ranging from the motor shaft 73 to the steering output shafts 41L and 41R and support shafts 101 when the vehicle is running forward and rearward.

Figure 7:
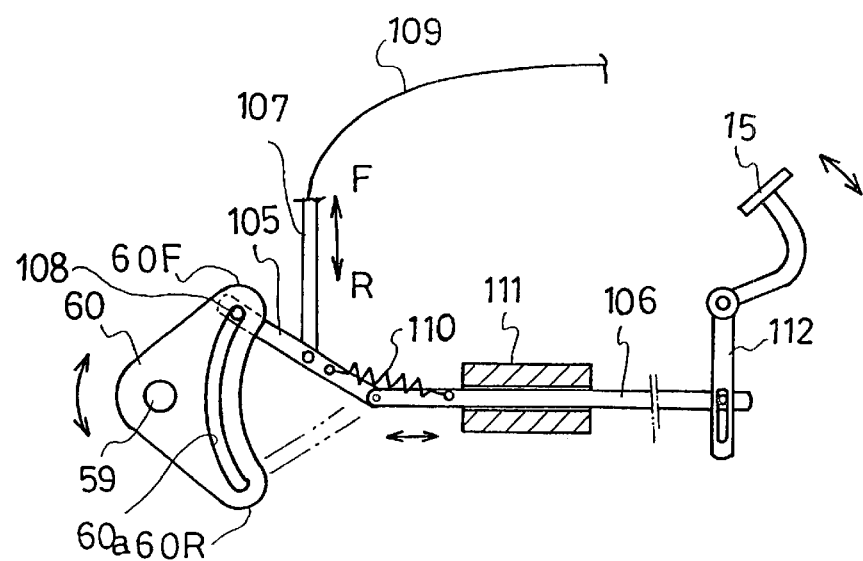
FIG. 7 is a side view of a mechanism for operatively interlocking a control arm of the speed-change HST and a speed-change pedal.
Figure 8:
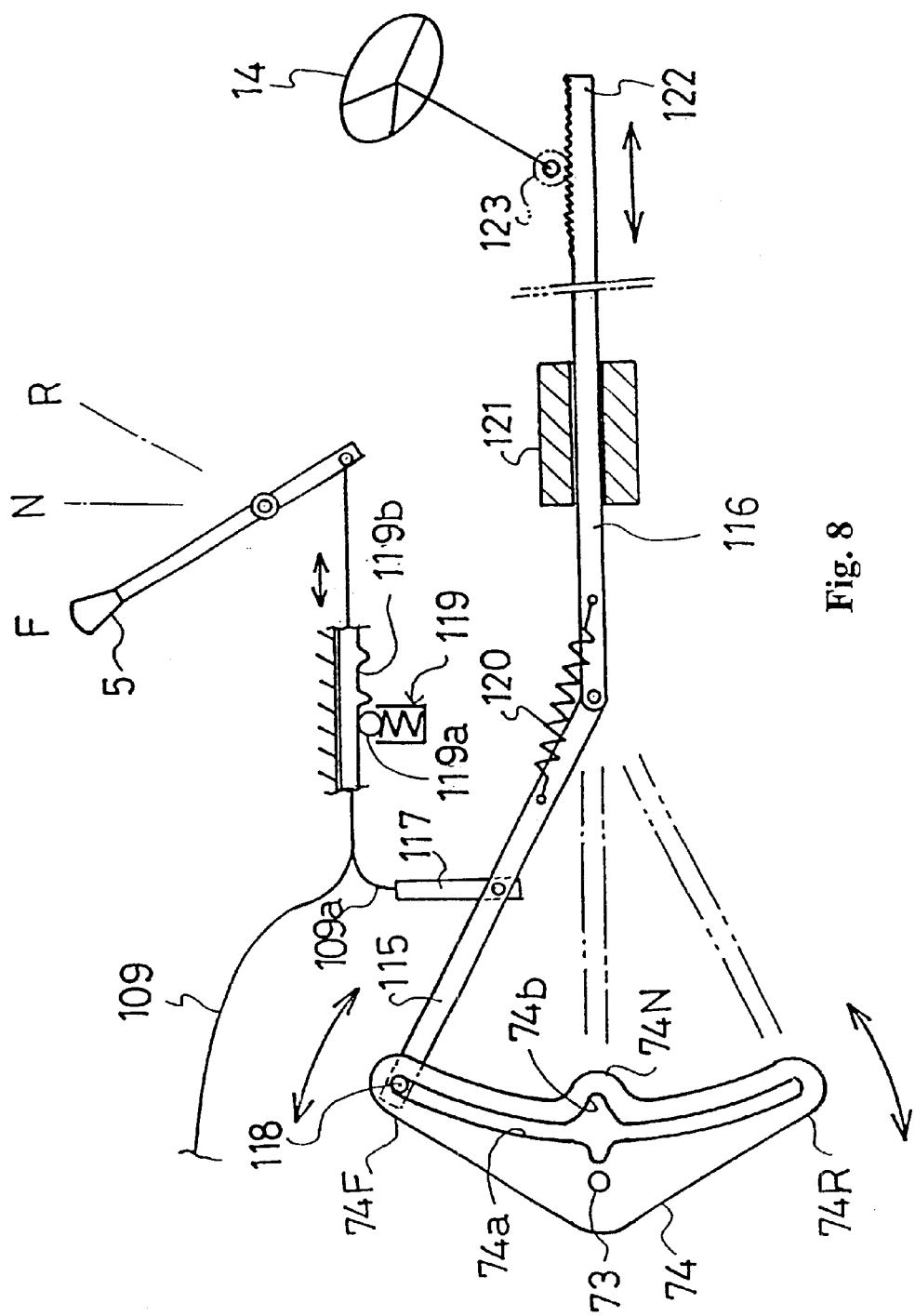
FIG. 8 is a side view showing a mechanism for operatively interlocking a control arm of the steering HST, a steering wheel and a reverser lever.

In the embodiment shown in FIGS. 7 and 8, the discharge of the pressured oil of the pump 71 of the steering HST 22 is switched in opposite directions when running forward or rearward. The link mechanism between the speed-change pedal 15 and the control arm 60, and the link mechanism between the steering handle 14 and the control arm 74 are operatively interlocked with the reverser lever 5. This configuration will be explained below.

First, explanation will be given of the operatively interlocking structure of the reverser lever 5 and the link mechanism between the speed-change pedal 15 and the control arm 60 for rotating the axles 40L, 40R in opposite directions according to whether the vehicle is running forward or rearward. As shown in FIGS. 1 to 3 and 7, the control shaft 59 is supported on the side wall of the housing 23 and protruded from a lateral side of the housing 23. The rear top end of the control arm 60 constituted of a substantially triangular plate member is fixed at the external end of the control shaft 59. The front end surface of the control arm 60, on the other hand, is formed arcuate with the swing link 105 as a radius and an arcuate hole 60*a* is open along the front end surface.

The pin 108 arranged at the rear end of the swing link 105 is slidably inserted into the arcuate hole 60*a*, and the front end of the swing link 105 is pivotally supported at the rear end of the connecting rod 106. Also, the intermediate portion of the swing link 105 is pivotally coupled to the lifting rod 107, which in turn is connected to an end (rear end) of the cable 109. The other end (front end) of the cable 109 is connected to the reverser lever 5. Also, a spring 110 is interposed between the swing link 105 and the connecting rod 106, so that the swing link 105 is urged to rotate upward or downward over the dead point. The energization force of the spring 110, however, is smaller than the energization force of the neutralizing spring for returning the movable swash plate 57 of the speed-change HST 21 in the axle driving apparatus 2 to the neutral position.

The intermediate portion in the longitudinal direction of the connecting rod 106 is slidably supported through a bossed member 111 or the like thereby to guide the sliding direction. The pin 106*a* arranged at the front end of the connecting rod 106 is slidably fitted in the slot of the arm 112, protruding substantially downward from the base of the speed-change pedal 15.

With this configuration, assume that the reverser lever 5 is arranged at the forward drive position F (FIG. 8). The cable 109 is pulled forward and the swing link 105 is rotated upward, so that the pin 108 is pressed into contact with the upper edge of the arcuate hole 60*a* by the upward energization force of the spring 110 over the dead point. Thus, the swing link 105 is held at the forward drive position 60F. Under this condition, when the speed-change pedal 15 is depressed, the rear end (free end) of the arm 112 rotates rearward and the connecting rod 106 is pressed rearward, so that the distance between the control shaft 59 and the rear end of the connecting rod 106 is shortened. As a result, the front end of the swing link 105, i.e. the connecting point with the rear end of the connecting rod 106 is moved rearward. At the same time, the rear end of the swing link 105, i.e. the pin 108, is moved upward in the rear direction. Thus, the pin 108 pushes the forward drive position 60F of the control arm 60 upward in the rear direction, and rotates the control shaft 59 counterclockwise, as show in FIG. 7. As a result, the movable swash plate 57 of the hydraulic pump 52 of the speed-change HST 21 is rotated in the forward drive direction, thereby rotating the motor shaft 54 of the hydraulic motor 53 in the forward drive direction.

When the reverser lever 5 is at the rearward drive position R (FIG. 8), on the other hand, the cable 109 is pressed rearward, the swing link 105 is rotated downward, and the pin 108 is pressed against the lower edge of the arcuate hole 60a by the downward force of the spring 110 over the dead point and held in the rearward drive position 60R. Under this condition, when the speed-change pedal 15 is depressed, as in the foregoing case, the connecting rod 106 is slid rearward. Thus, the rear end of the swing link 105, i.e. the pin 108, is moved down rearward, so that the rearward drive position 60R of the control arm 60 is pushed down rearward, so that the control shaft 59 is rotated clockwise as shown in FIG. 7. As a result, the movable swash plate 57 of the hydraulic pump 52 of the speed-change HST 21 is rotated in the rearward drive direction, thereby rotating the motor shaft 54 of the hydraulic motor 53 in the rearward drive direction.

Regardless of whether the reverser lever 5 is in the forward drive position F or the rearward drive position R, the releasing of the speed-change pedal 15 from the depressed state causes the connecting rod 106 to slide forward when the speed-change pedal 15 returns to its initial position. At the same time, the control shaft 53 and the control arm 54 are rotated to their initial position by the neutralizing spring of the speed-change HST 21.

Now, an explanation will be given of a link mechanism between the steering wheel 14 and the control arm 74 for reversing the direction of discharge of the pump 71 of the steering HST 22 between the forward drive and the rearward drive when turning the vehicle body in the same direction, the operatively interlocked structure between the link mechanism, and the reverser lever 5.

As shown in FIGS. 1 to 3 and FIG. 8, the control shaft 73 is supported on the side wall of the housing 23 and protrudes from a lateral side (the same side as the control shaft 59) of the housing 23. The rear top portion of the control arm 74 constituted of a substantially triangular plate member is fixed at the outer end of the control shaft 73. The front end surface of the control arm 74 is formed arcuate with the swing link 115, described later as a radius. An arcuate hole 74a is open along the same front end surface of the control arm 74. The upper end of the arcuate hole 74a represents the forward drive position 74F, and the lower end of the arcuate hole 74a represents the rearward drive position 74R. A neutral position 74N is set at the central portion of the arcuate hole 74a. At this neutral position 74N, a slot 74b is formed, in which the pin 108 is slidable in radial direction of the arcuate hole 74a (along the axis of the swing link 115).

The pin 118 arranged at the rear end of the swing link 115 is inserted slidably into the arcuate hole 74a, and the front end of the swing link 115 is pivotally supported on the rear end of the connecting rod 116. Also, the intermediate portion of the swing link 115 is pivotally coupled to the vertically movable rod 117. The vertically movable rod 117 is connected to an end of the cable 109a branching from the cable 109 extended from the reverser lever 5. An intermediate portion of the cable 109 shared by the cable 109a is formed with an engaging portion 119b to engage a detent mechanism 119. When the reverser lever 5 is set to the neutral position N between the forward drive position F and the rearward drive position R, the detent ball 119a of the detent mechanism 119 is fitted in the detent engaging portion 119b, thereby making it possible to hold the reverser lever 5 in the neutral position N. Also, a spring 120 is interposed between the swing link 115 and the connecting rod 116 thereby to energize the swing link 115 upward or downward over the dead point. The energization power of the spring 120, however, is smaller than the energization power of the neutralizing spring for returning the movable swash plate 76 of the steering HST 22 in the axle driving apparatus 2 to the neutral position, and is also smaller than the energization force of the detent mechanism 119.

The longitudinal intermediate portion of the connecting rod 116 is slidably supported through a bossed member 121 or the like whereby the connecting rod 116 is guided in the sliding direction. The front end of the sliding rod 116 is coupled to a rack 122 through a link or an arm. The rack 122 is in mesh with a the pinion 123 formed at the base of the steering wheel 14. The pinion 123 is adapted to rotate with the rotation of the steering wheel 14. The direction of rotation of the pinion 123 reverses when the steering wheel 14 is turned left and when it is turned right from the neutral position.

With this configuration, assume that the reverser lever 5 is set at the forward drive position F (FIG. 8). The cable 119 is pulled forward and the swing link 115 is rotated upward, so that the pin 118 is held at the forward drive position 74F at the upper end of the arcuate hole 74a. When the steering wheel 14 is manipulated under this condition, the connecting rod 116 slides longitudinally with the rack 122 as the pinion 123 rotates, so that the swing link 115 connected to the connecting rod 116 also moves longitudinally. Thus, the rear end of the swing link 115, i.e. the pinion 118, is held at the forward drive position 74F while swinging up rearward or down forward with the control arm 74. At the same time, the control shaft 73 rotates counterclockwise or clockwise.

In the case where the reverser lever 5 is set to the rearward drive position R (FIG. 8), on the other hand, the cable 119 is pushed rearward, and the swing link 115 is rotated downward. Thus, the pin 118 is held at the rearward drive position 74R at the lower end of the arcuate hole 74a. When the steering wheel 14 is manipulated under this condition, as in the preceding case, the connecting rod 116 slides longitudinally, and the pin 118 at the rear end of the swing link 115 is held at the rearward drive position 74R while being swung down rearward or up forward together with the control arm 74. At the same time, the control shaft 73 is rotated clockwise or counterclockwise.

In FIG. 8, assume that with the increase in the steering angle for a leftward turn from the straight drive position of the steering wheel 14, the rack 122 moves rearward, while with the increase in the steering angle for rightward turn, the rack 122 moves forward (the pinion 123 is rotated in the direction opposite to the case where the steering wheel 14 is rotated for a left turn). When the vehicle moving forward turns left, the swing link 115 is held at the forward drive position 74F while the connecting rod 116 slides rearward. Therefore, the pin 118 pushes up the control arm 74 rearward, so that the control shaft 73 rotates counterclockwise, as shown in FIG. 8. When the vehicle turns left while driving rearward, on the other hand, the swing link 115 is held at the rearward drive position R while the connecting rod 116 slides rearward. Therefore, the pin 118 pushes down the control arm 74 rearward, and the control shaft 73 is rotated clockwise as shown in FIG. 8.

As described above, when the steering wheel is turned left, the control shaft 73 is rotated in opposite directions according to whether the vehicle is driving forward or rearward. Thus the rotation of the motor shaft 77 is also opposite. This avoids the difficulty of having to turn the steering wheel 14 in opposite directions when the vehicle is driven forward and rearward. When driven both forward or rearward, the vehicle can be turned left by rotating the steering wheel 14 in the same direction.

Conversely, when the steering wheel 14 is manipulated for right turn, on the other hand, the rack 122 and the connecting rod 115 slide forward. During the forward drive, the control arm 74 is swung down forward with the pin 118 at the forward drive position 74F, while at the time of rearward drive, the control arm 74 is swung up forward together with the pin 118 at the rearward drive position 74R. In spite of the same steering operation to turn right, therefore, the direction of rotation of the control shaft 73 is reversed according to whether the vehicle is running forward or rearward. In this way, regardless of whether the vehicle is running forward or rearward, the vehicle can be turned right by rotating the steering wheel 14 in the same direction.

When the reverser lever 5 is set to the neutral position N, the pin 108 of the swing link 105 is located at an intermediate position between the forward drive position 60F and the rearward drive position 60R of the control arm 60, and the connecting rod 106 is held in a position unable to slide longitudinally.

At this time, an attempt to depress the speed-change pedal 15 fails and the control arm 60 would not rotate, so that the vehicle is unable to be driven forward or rearward with the control shaft 59 remaining at a neutral position.

On the other hand, the pin 108 of the swing link 115 is at the neutral position N of the control arm 74. Even when the steering wheel 14 is rotated to slide the connecting rod 116 longitudinally, the pin 118 slides only within the slot 74b, and the control arm 74 fails to rotate. Thus, the control shaft 73 also remains at neutral position. As a result, the vehicle body is not turned abruptly from the stationary state.

As described above, as long as the reverser lever 5 is located at the neutral position N, the axles 40L, 40R are not rotated and safety is assured.

In the configuration described above, the arcuate holes 60a, 74a of the control arms 60, 74 may be replaced with guide rails for guiding the swing links 105, 115. Further, FIGS. 7 and 8 assume the longitudinal arrangement of the parts, on the assumption that the speed-change pedal 15, the steering wheel 14 and hence the reverser lever 5 are arranged forward of the control arms 60, 74. These relative positions are, however, not necessarily limitative but a link mechanism can be employed with equal effect if it can exhibit a similar function.

In the axle driving apparatus 2 according to the embodiment shown in FIGS. 10 to 14, the direction of the output rotation of the motor 71 of the steering HST 22 is the same in forward drive mode as in rearward drive mode when turning the vehicle body in the same direction. The configuration according to this embodiment, however, is provided with a reversing mechanism 89 between the steering differential arrangement 7 and the motor output shaft, whereby the input rotation of the steering differential arrangement 7 is reversed between the forward drive mode and the rearward drive mode. The reversing mechanism 89 includes two transmission trains, a forward rotation transmission train and a reverse rotation transmission train operatively interlocked with the input means of the steering differential arrangement 7, and select means for selectively coupling one of the transmission trains to the motor shaft 77.

Figure 10:
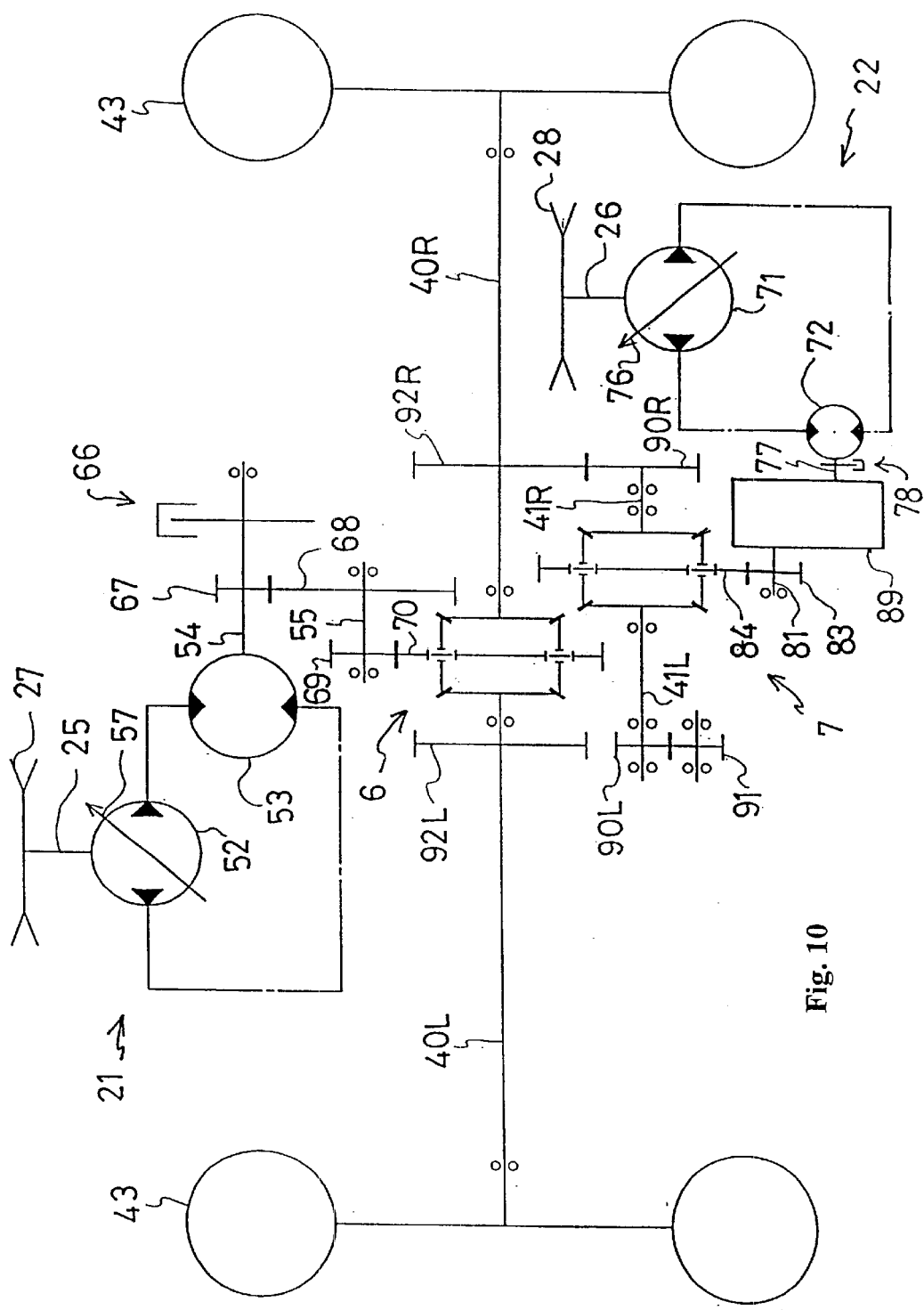
FIG. 10 is a schematic diagram showing a transmission mechanism, arranged in the housing of an axle driving apparatus according to the invention of FIG. 9, in which the pair of differential arrangements are comprised of a pair of differential gear mechanisms, and a forward rotation/reverse rotation switching transmission mechanism is interposed between the output unit of the steering HST and the steering differential arrangement.
Figure 11:
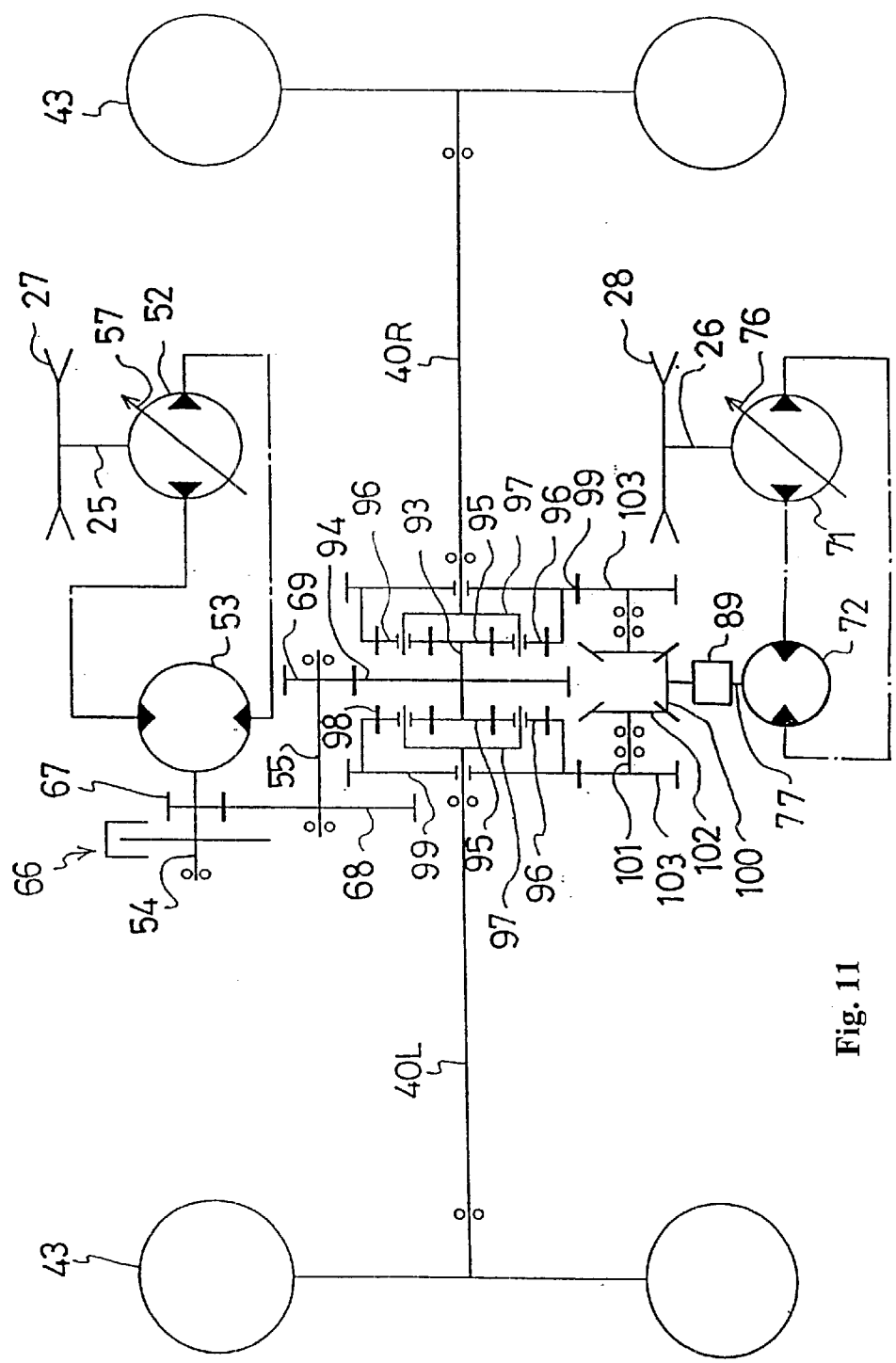
FIG. 11 is a schematic diagram showing another embodiment, in which one of the pair of differential arrangements for coupling the axles differentially is a planetary gear mechanism, the other of the pair of differential arrangements for differentially coupling the steering output shafts is a bevel gear mechanism, and a forward rotation/reverse rotation switching transmission mechanism is interposed between the output unit of the steering HST and the steering differential arrangement.

In the configuration of the axle driving apparatus 2 shown in FIG. 10, similar to FIG. 5, the differential arrangements 6, 7 make up a differential gear mechanism. In the axle driving apparatus 2 of FIG. 11, on the other hand, like in FIG. 6, the normal differential arrangement 6 is constituted of a planetary gear mechanism and the steering differential arrangement 7 is constituted of a bevel gear mechanism. In the case of FIG. 10, the reversing mechanism 89 is interposed in place of the reduction gear trains 80, 82 shown in FIG. 5, between the motor shaft 77 and the deceleration shaft 81. In the case of FIG. 11, on the other hand, the reversing mechanism 89 is added between the motor shaft 77 and the bevel gear 100. The configuration of the reversing mechanism 89 itself is disclosed below as a first embodiment in FIG. 12, a second embodiment in FIG. 13, and a third embodiment in FIG. 14. The reversing mechanisms 89 disclosed in FIGS. 10 and 11 may be any embodiment shown in FIGS. 12, 13 and 14.

A configuration of a lawn mower employing this axle driving apparatus 2 will be explained with reference to FIG. 9. The lawn mower according to this embodiment is not provided with the reverser lever 5, and includes a speed-change pedal 15' having the function of switching the forward drive and the rearward drive instead of the speed-change pedal 15 described above. The speed-change pedal 15' has a forward drive depression plate 15'a and a rearward drive depression plate 15'b on the two sides of a rotary supporting point 15'c, respectively, and a rotary arm 15'd extending downward of the rotary supporting point 15'c.

In the axle driving apparatus 2, on the other hand, a control arm 60' for the speed-change HST 21 in place of the control arm 60 and a control arm 74' for the steering HST 22 in place of the control arm 74, are fixed on the control shafts 59, 73, respectively. The control arm 60' is coupled to a link extending from the rotary arm 15'd and adapted for rotation forward or rearward from the neutral position. When the forward drive depression plate 15'a is depressed, the control arm 60' is rotated in one of the longitudinal directions in accordance with the depression angle. When the rearward drive depression plate 15'b is depressed, on the other hand, the control arm 60' is rotated in the other direction in accordance with the depression angle. In this way, the control shaft 59 is rotated in opposite directions on either side of the neutral position according to whether the vehicle is driving forward or rearward.

The control arm 74', which is coupled to the link adapted for longitudinal motion with the rotation of the steering wheel 14, is also rotated forward or rearward from the neutral position. When the steering wheel 14 is turned in one of the clockwise and counterclockwise directions from the straight drive position, the control arm 74' is rotated in one of the longitudinal directions in accordance with the amount of rotation of the steering wheel 14. When the steering wheel 14 is turned in the other direction, the control arm 74' is rotated in the other direction in accordance with the amount of rotation of the steering wheel 14. In this way, the control shaft 73 is rotated in opposite directions on either side of the neutral position according to whether the steering wheel is turned in clockwise or counterclockwise direction.

A reversing mechanism 89 according to the first embodiment will be explained with reference to FIG. 12. The steering differential arrangement 7 as shown in FIG. 12 is configured of the differential gear mechanism of FIG. 10.

Figure 12:
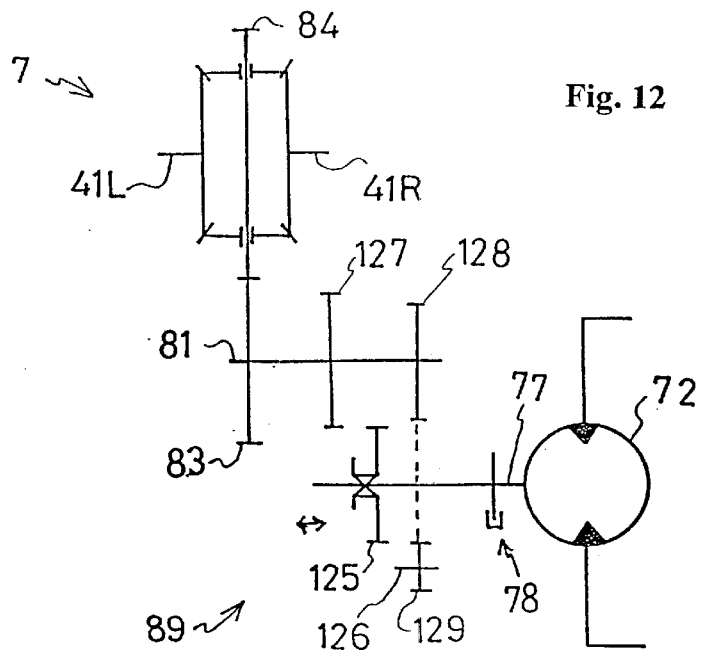
FIG. 12 is a schematic diagram showing a forward rotation/reverse rotation switching transmission mechanism according to a first embodiment.

According to the first embodiment shown in FIG. 12, the forward drive deceleration gear train and the rearward drive deceleration gear train are operatively interlocked with the deceleration shaft 81 providing input means for the steering differential arrangement 7. Either the forward drive deceleration gear train or the rearward drive deceleration gear train is selectively coupled to a motor shaft 77 by a sliding gear 125. First, the sliding gear 125 is fitted with spline on the motor shaft 77 in a slidable manner and is not relatively rotatable. The deceleration shaft 81 and the intermediate shaft 126 are arranged in parallel to the motor shaft 77. The forward drive gear 127, the rearward drive gear 128 and the deceleration gear 83 are fixed on the deceleration shaft 81. The intermediate gear 129 is fixed on the intermediate shaft 126 and in mesh with the rearward drive gear 128. A shift fork (not shown) is fitted in the sliding gear 125 and, through a link or the like, coupled to the forward/rearward drive switching means (the speed-change pedal 15' as shown in FIG. 9), which is arranged in the vehicle driving unit. In accordance with the operation for switching the forward/rearward drive setting, the sliding gear 125 slides on the motor shaft 77 into engagement with one of the forward drive gears 127 and the intermediate gear 129.

In using the reversing mechanism 89 shown in FIG. 12 with the axle driving apparatus 2 shown in FIG. 1, the motor shaft 77 and the gear shaft of the bevel gear 100 are provided as separate parts. A sliding gear 125 is arranged slidably on the motor shaft 77, and the forward drive gear 127 and the rearward drive gear 128 are fixed on the gear shaft. The rearward drive gear 128 is kept in mesh with the intermediate gear 129 on the intermediate shaft 126, and the sliding gear 125 is selectively brought in mesh with one of the forward drive gear 127 and the intermediate gear 129 in accordance with the forward/rearward drive setting.

In the forward drive setting, the sliding gear 125 is in mesh with the forward drive gear 127. When the steering wheel 14 is manipulated to turn left, for example, the turning effort of the motor shaft 77 for a left turn is transmitted from the sliding gear 125 to the forward drive gear 127, the gear 83, the steering differential arrangement 7 and the steering output shafts 41L, 41R.

In the process, the axles 40L, 40R are in rotation for forward drive. Therefore, the gear 92R on the axle 40R and the gear 90R on the steering output shaft 41R are rotating in opposite directions as viewed from the same side, so that the rotation of the gear 90R accelerates the gear 92R thereby to increase the speed of the right axle 40R. On the other hand, the gear 92L on the axle 40L and the intermediate gear 91 (in mesh with the steering output shaft 90L) are rotating in the same direction as viewed from the same side. Thus, the rotation of the gear 91 decelerates the gear 92L, thereby decreasing the speed of the left axle 40L. In this way, the vehicle body is turned left.

At the rearward drive setting, on the other hand, the sliding gear 125 is in mesh with the intermediate gear 129. When the steering wheel 14 is operated to the same side as in the preceding case, therefore, the motor shaft 77 is rotated in the same direction but the turning effort thereof is transmitted from the sliding gear 125 to the intermediate gear 129, the rearward drive gear 128, the gear 83, the steering differential arrangement 7 and the steering output shafts 41L, 41R. Thus, the steering output shafts 41L, 4IR are rotating in the direction opposite to the rotation for forward drive, and the axles 40L and 40R are rotating in the direction for rearward drive opposite to the rotation for forward drive. Therefore, the gear 92R on the axle 40R and the gear 90R on the steering output shaft 41R are rotating in opposite directions as viewed from the same side, so that the rotation of the gear 90R accelerates the gear 92R thereby to increase the speed of the right axle 40R. On the other hand, the gear 92L on the axle 40L and the intermediate gear 91 (in mesh with the steering output shaft 90L) are rotating in the same direction as viewed from the same side. Thus, the rotation of the gear 91 decelerates the gear 92L to thereby reduce the speed of the left axle 40L. Consequently, the vehicle body is turned left by manipulating the steering wheel 14 in the same direction as at the forward drive setting.

When the steering wheel 14 is manipulated in the opposite direction, on the other hand, the rotation of the motor shaft 77 itself is opposite to the preceding case. Between the forward and back drive setting, however, the axles 40L, 40R rotate in opposite direction to the forward drive setting, and so do the steering output shafts 41L, 41R. In both the forward drive setting and the rearward drive setting, therefore, the axle 40L is accelerated while the axle 40R is decelerated, to thereby turn the vehicle body to the right.

As described above, the steering wheel 14 is rotated in the same direction in both the forward and rearward drive setting in each case of turning the vehicle to right or left. Thus, the vehicle can be driven rearward with the same feeling as experienced with an ordinary passenger car.

Figure 13:
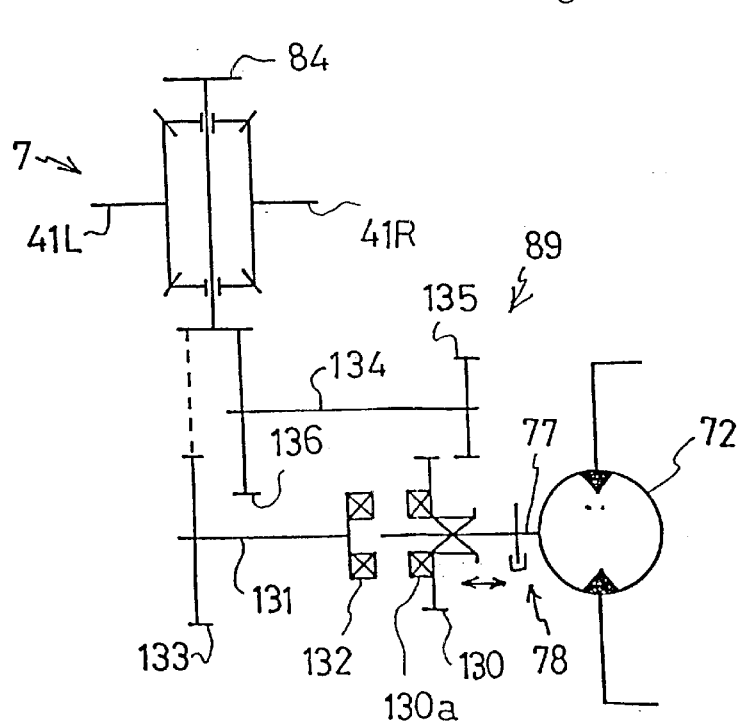
FIG. 13 is a schematic diagram showing the mechanism of FIG. 12 according to a second embodiment.

According to the second embodiment shown in FIG. 13, one of the forward rotation transmission train and the reverse rotation transmission train is selectively coupled to the motor shaft 77 using a dog clutch. Specifically, the sliding gear 130 is spline fitted on the motor shaft 77, and a clutch pawl 130a is formed on the side of the sliding gear 130. A transmission shaft 131 is arranged on the extension of the motor shaft 77, coaxial therewith, and a clutch pawl 132 engageable with the clutch pawl 130a is arranged in opposed relation thereto on the transmission shaft 131. Further, a gear 133 is fixed on the transmission shaft 131 to engage the ring gear 84.

Also, a reverse rotation shaft 134 is arranged in parallel to the motor shaft 77, and a reverse rotation gear 135 is fixed on the reverse rotation shaft 134 in a manner engageable with the sliding gear 130. Further, a gear 136 is arranged on the reverse rotation shaft 134 to engage the ring gear 84.

A shift fork (not shown) is fitted on the sliding gear 130, and is coupled, like the sliding gear 125 shown in FIG. 12, to the forward/rearward drive setting means (speed-change pedal 15').

Figure 14:
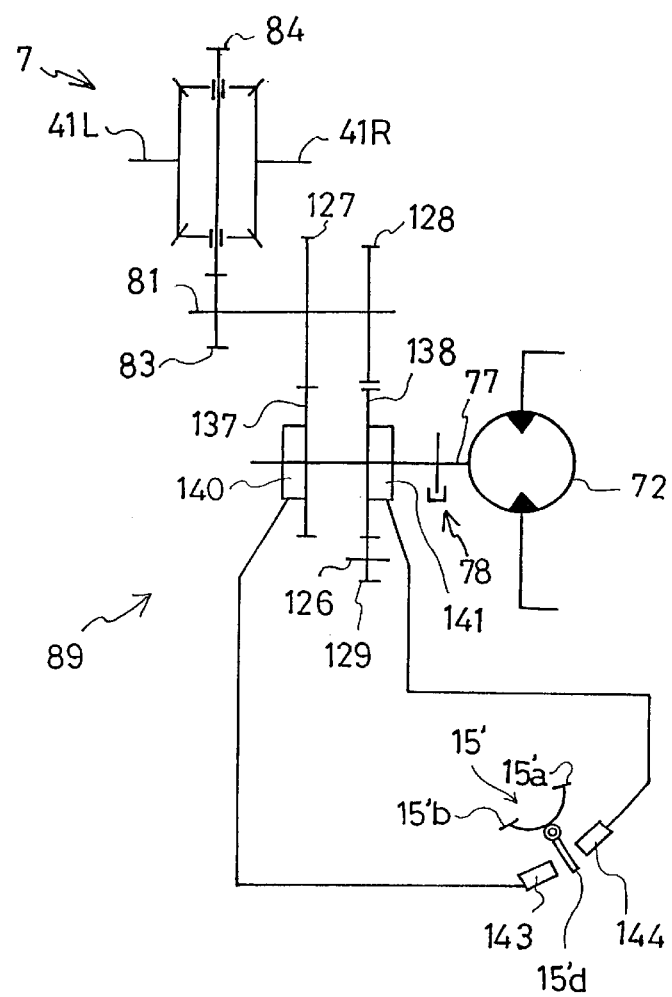
FIG. 14 is a schematic diagram showing the same mechanism of FIG. 12 according to a third embodiment.

In the case where the reverse rotation mechanism 89 shown in FIG. 14 is used for the axle driving apparatus 2 configured as shown in FIG. 11, the motor shaft 77 and the gear shaft of the bevel gear 100 are arranged as separate parts. The transmission shaft 131 is arranged coaxially with the motor shaft 77, and in parallel to the transmission shaft 131, the reverse rotation shaft 134 is arranged. Further, still another gear in mesh with the gears 133, 136 is arranged on the gear shaft of the bevel gear 100.

At the forward drive setting, the clutch pawl 130a of the sliding gear 130 is in mesh with the clutch pawl 132. In the case where the steering wheel 14 is manipulated to turn left, for example, the transmission shaft 131 rotates integrally with the motor shaft 77. This rotation is transmitted through the gear 133 to the steering differential arrangement 7 to rotate the steering output shafts 41L, 41R in a predetermined direction. In the process, the axles 40L, 40R are rotating for forward drive, and the left axle 40L is decelerated while the right axle 40R is accelerated to thereby turn the vehicle to the left.

At the rearward drive setting, on the other hand, the sliding gear 130 is in mesh with the reverse rotation gear 135. When the steering wheel 14 is manipulated to the left again, the motor shaft 77 rotates in the same direction. The turning effort thereof, however, is transmitted through the sliding gear 130, the reversing gear 135, the reversing shaft 134, the gear 136 and the steering differential arrangement 7 to the steering output shafts 41L, 41R. Thus, the steering output shafts 41L, 4IR rotate in the direction opposite to the direction rotated when in the forward setting. Since the axles 40L and 40R rotate for rearward drive, the left axle 40L is decelerated while the right axle 40R is accelerated thereby turning the vehicle to the left. In this way, the vehicle turns left when the steering wheel 14 is manipulated in the same direction as when the vehicle is driving forward.

When the steering wheel 14 is manipulated in the opposite direction, the left axle 40L is accelerated while the right axle 40R is decelerated so that the vehicle body turns right both in forward drive mode and rearward drive mode.

Thus the steering wheel 14 is rotated in the same direction in each case of turning the vehicle right or left regardless of whether the vehicle is driven forward or rearward.

In the embodiment shown in FIG. 13, a ball clutch can be used in place of the sliding gear or the clutch pawl.

In the reversing mechanism 89 shown in FIG. 14, one of the forward rotation transmission train and the reverse rotation transmission train is selectively coupled to the motor shaft 77 using an electromagnetic clutch. First, as in the embodiment shown in FIG. 12, the deceleration axis 81 and the intermediate axis 126 are arranged in parallel to the motor shaft 77. A forward drive gear 127, a rearward drive gear 128 and a gear 83 are fixed on the deceleration shaft 81, and an intermediate gear 129 is fixed on the intermediate shaft 126.

On the other hand, gears 137, 138 are arranged through electromagnetic clutches 140, 141 on the motor shaft 77. The gear 137 is in mesh with the forward drive gear 127, and the gear 138 in mesh with the rearward drive gear 128.

Figure 9:
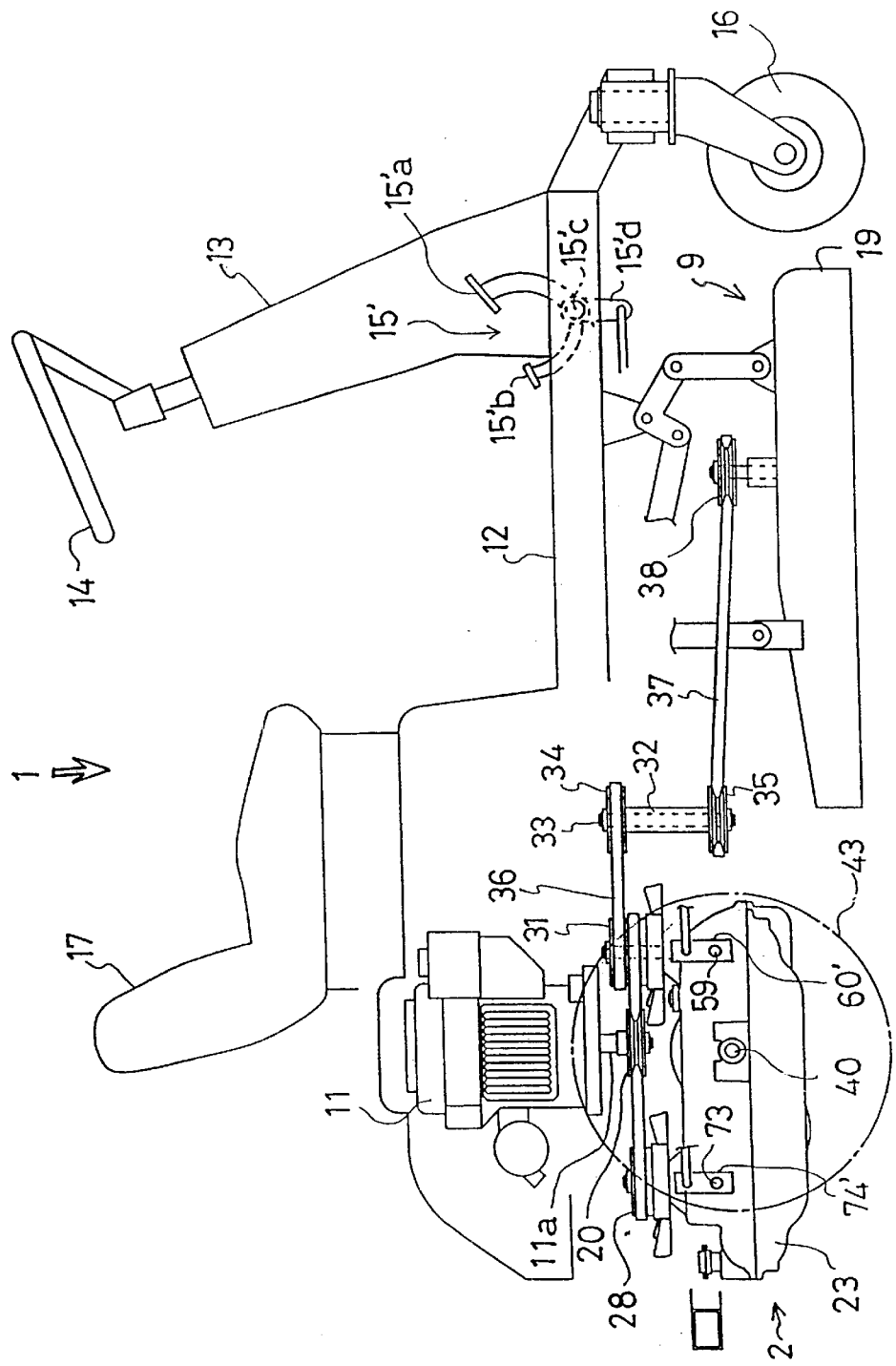
FIG. 9 is a side view showing a mower vehicle employing an axle driving apparatus according to another embodiment of this invention, in which the speed-change pedal functions as the forward/rearward drive switching operation means.

In the embodiment applied to the lawn mower as shown in FIG. 9, upon depression of the forward drive depression plate 15'*a* of the speed-change pedal 15', the motor shaft 54 of the speed-change HST 21 rotates in one direction. Thus, the axles 40L, 40R rotate in the forward drive direction. When the rearward drive depression plate 15'*b* is depressed, on the other hand, the motor shaft 54 rotates in the opposite direction so that the axles 40L, 40R rotate for rearward drive.

As shown in FIG. 14, a forward drive detection switch 143 and a rearward drive detection switch 144 are arranged in the vicinity on both sides of the rotary arm 15'*d* of the speed-change pedal 15'. When the forward drive depression plate 15'*a* is depressed, the forward drive detection switch 143 turns on, so that the electromagnetic clutch 140 is set in engagement and the turning effort of the motor shaft 77 is transmitted to the forward drive gear 127 from the gear 137. When the rearward drive depression plate 15'*b* is depressed, on the other hand, the rearward drive detection switch 144 is turned on, and the electromagnetic clutch 141 is set in engagement. Thus, the turning effort of the motor shaft 77 is transmitted from the gear 138 to the rearward drive gear 128 through the intermediate gear 126. The subsequent operation is similar to the corresponding operation in the embodiment as shown in FIG. 12.

According to the embodiment shown in FIG. 14, the hydraulic clutch can be used in place of the electromagnetic clutch. In such a case, the hydraulic clutch may be so configured as to be switched by the electromagnetic valve, and the spool of the valve can be operatively interlocked with the speed-change pedal 15' through a link or the like.

In the neutral mode with the speed-change pedal 15' not depressed, the sliding gear 125 in the embodiment shown in FIG. 12 engages none of the gears. In the embodiment shown in FIG. 13, on the other hand, neither the sliding gear 130 engages the reverse rotation gear 135 nor the clutch pawls 130*a*, 132 engage each other. In the embodiment shown in FIG. 14, both the electromagnetic clutches 140, 141 are disengaged. Even when the steering wheel 14 is rotated when the vehicle is stationary, the power from the steering HST 22 is not transmitted to the differential arrangement 6 and therefore the vehicle is not turned. In this way, the vehicle is kept stationary even if the steering wheel 14 is held by hand and turned by mistake when a passenger is getting on or off.

What is claimed is:

1. A axle driving apparatus comprising;

a pair of axles;

a speed-change HST including a fluid pressure pump of variable capacity type and a fluid pressure motor coupled to each other by a fluid;

a first differential arrangement power-coupled to an output shaft of the motor of said speed-change HST for differentially coupling a pair of said axles to each other;

a steering HST including a fluid pressure pump of variable capacity type and a fluid pressure motor coupled by a fluid to each other;

a second differential arrangement power-coupled to an output shaft of the motor of said steering HST;

a forward rotation/reverse rotation switching transmission mechanism interposed between an output means of said steering HST and an input means of said second differential arrangement;

a pair of steering output shafts differentially coupled to each other through said second differential arrangement;

a first transmission train interposed between one of said steering output shafts and one of said pair of axles, and a second transmission train interposed between the other steering output shaft and other axle for transmitting the turning effort to said other axle in the opposite direction to said first transmission train.

2. An axle driving apparatus according to claim 1, wherein said forward rotation/reverse rotation switching transmission mechanism includes a forward rotation transmission train coupled to the input means of said second differential arrangement, a reverse rotation transmission train coupled to the input means of said second differential arrangement, and selective coupling means for selectively coupling one of said forward rotation transmission train and said reverse rotation transmission train to the output means of the motor of said steering HST.

3. An axle driving apparatus according to claim 2, further comprising forward/rearward drive setting switching means outside of a housing of the axle driving apparatus;

wherein said selective coupling means selects one of said forward rotation transmission train and said reverse rotation transmission train and connecting the selected transmission train to the output means of the motor of said steering HST in accordance with the switching of the forward/rearward drive setting by said forward/rearward drive setting operation means.

4. An axle driving apparatus according to claim 2, wherein the output means of the motor of said steering HST constitutes an output shaft;

wherein said selective coupling means is a sliding gear arranged on said output shaft slidably and not relatively rotatably;

wherein said forward rotation transmission train and said reverse rotation transmission train both include a gear adapted to engage said sliding gear; and wherein said sliding gear selectively engages one of said forward rotation transmission input gear and said reverse rotation transmission input gear.

5. An axle driving apparatus according to claim 2, wherein the output means of the motor of said steering HST constitutes an output shaft;

wherein said selective coupling means includes a sliding gear arranged on said output shaft slidably and not relatively rotatably and a clutch attached to said sliding gear;

wherein selected one of said forward rotation transmission train and said reverse rotation transmission train includes a gear adapted to engage said sliding gear;

wherein selected one of said forward rotation transmission train and said reverse rotation transmission train includes a clutch adapted to engage said first clutch; and wherein one of the engagement of said sliding gear and the engagement of said clutch is selected.

6. An axle driving apparatus according to claim 1, wherein said forward rotation/reverse rotation switching transmission mechanism includes a forward rotation transmission train coupled to the input means of said second differential arrangement, a first electromagnetic clutch adapted to cause said forward rotation transmission train to engage or disengage from the motor output means of said steering HST, a reverse rotation transmission train coupled to the input means of said second differential arrangement, and a second electromagnetic clutch adapted to cause said reverse rotation transmission train to engage or disengage from the motor output means of said steering HST;

wherein the forward/rearward drive setting operation means is arranged outside of a housing of the axle driving apparatus; and wherein one of said first electromagnetic clutch and said second electromagnetic clutch is selected and engaged by switching the forward/rearward drive setting by said forward/rearward setting operation means.

7. An axle driving apparatus according to claim 1, wherein said first differential arrangement and said second differential arrangement are configured of a differential gear mechanism.

8. An axle driving apparatus according to claim 1, wherein said first differential arrangement is a planetary gear mechanism and said second differential arrangement is a bevel gear mechanism.

9. An axle driving apparatus according to claim 1, wherein a housing is arranged;

said speed-change HST and said steering HST, a pair of said axles and a pair of said output shafts for steering, said first differential arrangement and said second differential arrangement, said first transmission train and said second transmission train, said first adjusting means and said second adjusting means, and said forward rotation/reverse rotation switching transmission mechanism are accommodated in said housing.

10. A vehicle comprising:

an integral transaxle apparatus for driving and steering a vehicle, including;

a housing, a driving hydrostatic transmission having a variable displacement first hydraulic pump and a first hydraulic motor fluidly connected with each other, said driving hydrostatic transmission being disposed in said housing, wherein said first hydraulic pump receives power of a prime mover and has a first movable swash plate, a steering hydrostatic transmission having a variable displacement second hydraulic pump and a second hydraulic motor fluidly connected with each other, said steering hydrostatic transmission being disposed in said housing, wherein said second hydraulic pump receives power of said prime mover independently of said first hydraulic pump and has a second movable swash plate, a pair of axles disposed co-axially with each other and supported in said housing, and a differential unit differentially connecting said axles with each other, said differential unit being disposed in said housing, wherein said differential unit is driven regularly or reversely by the output of said driving hydrostatic transmission and differentially drives said axles while receiving the output of said steering hydrostatic transmission;

manually operable driving operating means disposed on said vehicle apart from said transaxle apparatus for slanting operation of said first movable swash plate so as to switching the traveling direction between forward and backward and to change the traveling speed, and manually operable steering operating means disposed on said vehicle apart from said transaxle apparatus for slanting operation of said second movable swash plate so as to determine the leftward and rightward cornering angle, wherein said vehicle turns laterally in the same direction of leftward and rightward steering operation of said steering operating means whether said vehicle travels forward or backward.

\* \* \* \* \*